United States Patent
Thompson et al.

(10) Patent No.: US 8,718,371 B2
(45) Date of Patent: May 6, 2014

(54) METHODS, APPARATUSES, AND SYSTEMS FOR IMAGE-BASED MEASUREMENT AND INSPECTION OF PRE-ENGINEERED STRUCTURAL COMPONENTS

(75) Inventors: Cyril Robert Thompson, Visalia, CA (US); Steven Corley, Temecula, CA (US)

(73) Assignee: Building Component Verification Systems, Inc., Visalia, CA (US)

(*) Notice: Subject to any disclaimer, the term of this patent is extended or adjusted under 35 U.S.C. 154(b) by 0 days.

(21) Appl. No.: 13/411,601

(22) Filed: Mar. 4, 2012

(65) Prior Publication Data

US 2012/0163673 A1 Jun. 28, 2012

Related U.S. Application Data

(62) Division of application No. 12/012,016, filed on Jan. 30, 2008, now Pat. No. 8,131,008.

(60) Provisional application No. 60/898,556, filed on Jan. 31, 2007.

(51) Int. Cl.
*G06K 9/00* (2006.01)

(52) U.S. Cl.
USPC ........... 382/181; 382/100; 382/232; 356/460; 356/431; 356/429; 493/374

(58) Field of Classification Search
CPC .......... H04N 1/44008; H04N 1/00326; H04N 1/32144; H04N 2201/3269; H04N 1/00005; H04N 1/0035

USPC .......... 382/181, 100, 232; 356/430, 431, 429; 493/374

See application file for complete search history.

(56) References Cited

U.S. PATENT DOCUMENTS

| | | | |
|---|---|---|---|
| 3,871,213 A | | 3/1975 | Jureit et al. |
| 4,514,899 A | | 5/1985 | Burger |
| 4,550,376 A | | 10/1985 | Maciejczak |
| 4,789,947 A | | 12/1988 | Maciejczak |
| 4,945,492 A | | 7/1990 | Bennett |
| 4,965,740 A | | 10/1990 | Schofield et al. |
| 5,504,674 A | | 4/1996 | Chen |
| 5,506,914 A | * | 4/1996 | Baker ........................ 382/141 |

(Continued)

OTHER PUBLICATIONS

Connector Detector, Koorsen Manufacturing Incorporated, Oct. 20, 2006.

*Primary Examiner* — Mike Rahmjoo
(74) *Attorney, Agent, or Firm* — Mark D. Miller; Marcus N. DiBuduo; William K. Nelson

(57) ABSTRACT

Methods, apparatuses, and systems for image-based measurement and inspection of pre-engineered structural components, such as building trusses and wall panels. A system can include: a light source; a camera; a first memory storage; a second memory storage; and a processing unit configured to (i) detect a characteristic of the structural component, (ii) compare the characteristic to a corresponding characteristic of at least one reference data, and (iii) indicate a result of the comparison. A method can include: causing a light source to illuminate a portion of the structural component, receiving a reflection of the light source from the illuminated portion of the structural component, and storing data corresponding to the intensity of the reflection; comparing the stored data to at least one reference data; and indicating a result of the comparison.

49 Claims, 22 Drawing Sheets

(56) References Cited

U.S. PATENT DOCUMENTS

| | | |
|---|---|---|
| 5,594,593 A | 1/1997 | Milner |
| 5,873,567 A * | 2/1999 | Williams ............ 269/37 |
| 5,960,413 A * | 9/1999 | Amon et al. ......... 705/28 |
| 6,031,567 A * | 2/2000 | Johnson ............. 348/91 |
| 6,100,810 A | 8/2000 | Koorsen |
| 6,366,351 B1 | 4/2002 | Ethier et al. |
| 6,731,991 B1 | 5/2004 | Michalski et al. |
| 6,935,748 B2 | 8/2005 | Kaufman et al. |
| 6,990,384 B2 | 1/2006 | Miller et al. |
| 7,248,716 B2 | 7/2007 | Fein |
| 7,307,729 B2 | 12/2007 | Moshe |
| 7,894,920 B2 | 2/2011 | Mifsud et al. |
| 2002/0085093 A1 * | 7/2002 | Frigon et al. ........... 348/91 |
| 2003/0109991 A1 * | 6/2003 | Lessard et al. ......... 702/42 |
| 2004/0234118 A1 * | 11/2004 | Astrom et al. ......... 382/141 |
| 2005/0058332 A1 | 3/2005 | Kaufman et al. |
| 2006/0033919 A1 | 2/2006 | Moshe |
| 2007/0265724 A1 | 11/2007 | Mifsud et al. |

* cited by examiner

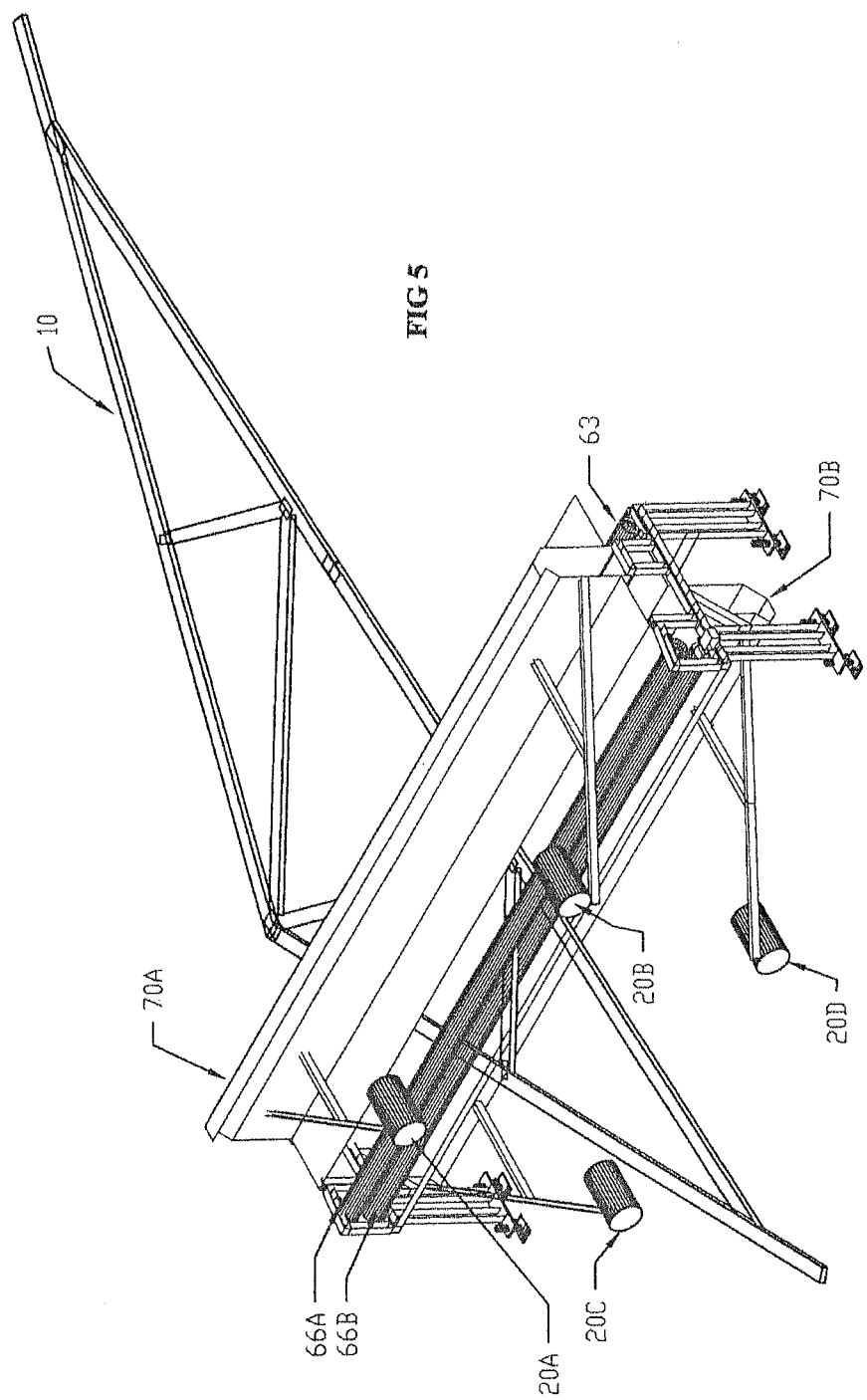

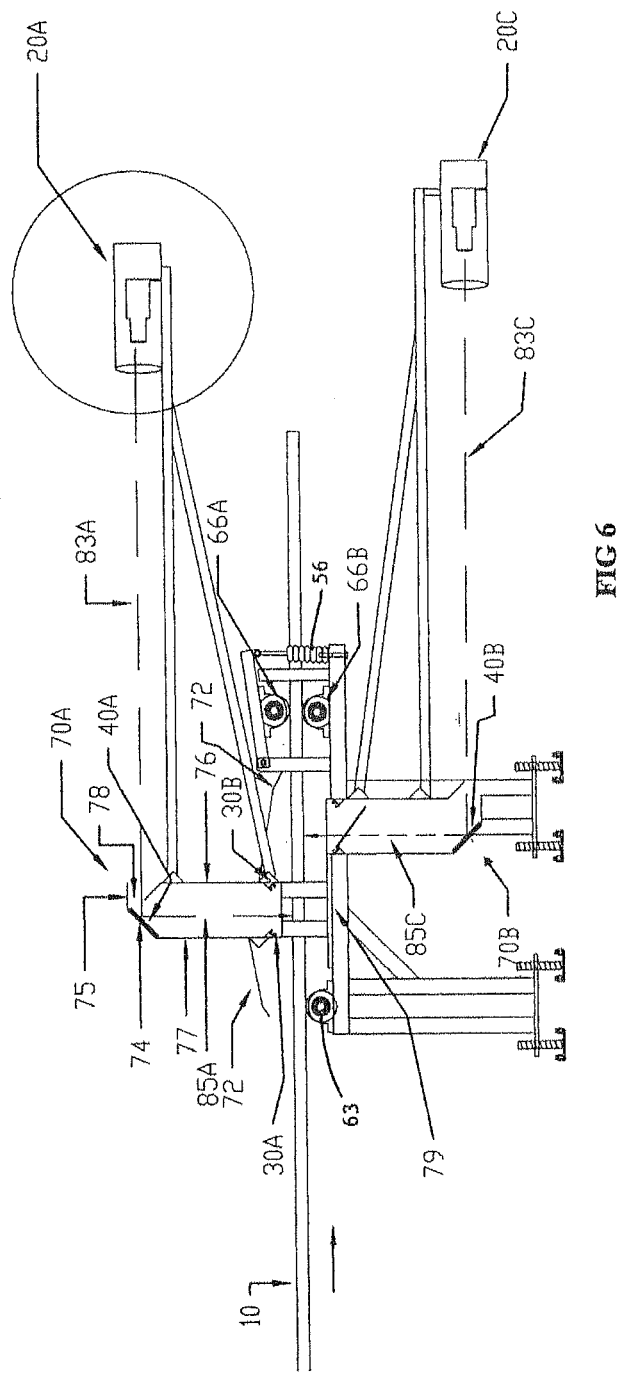

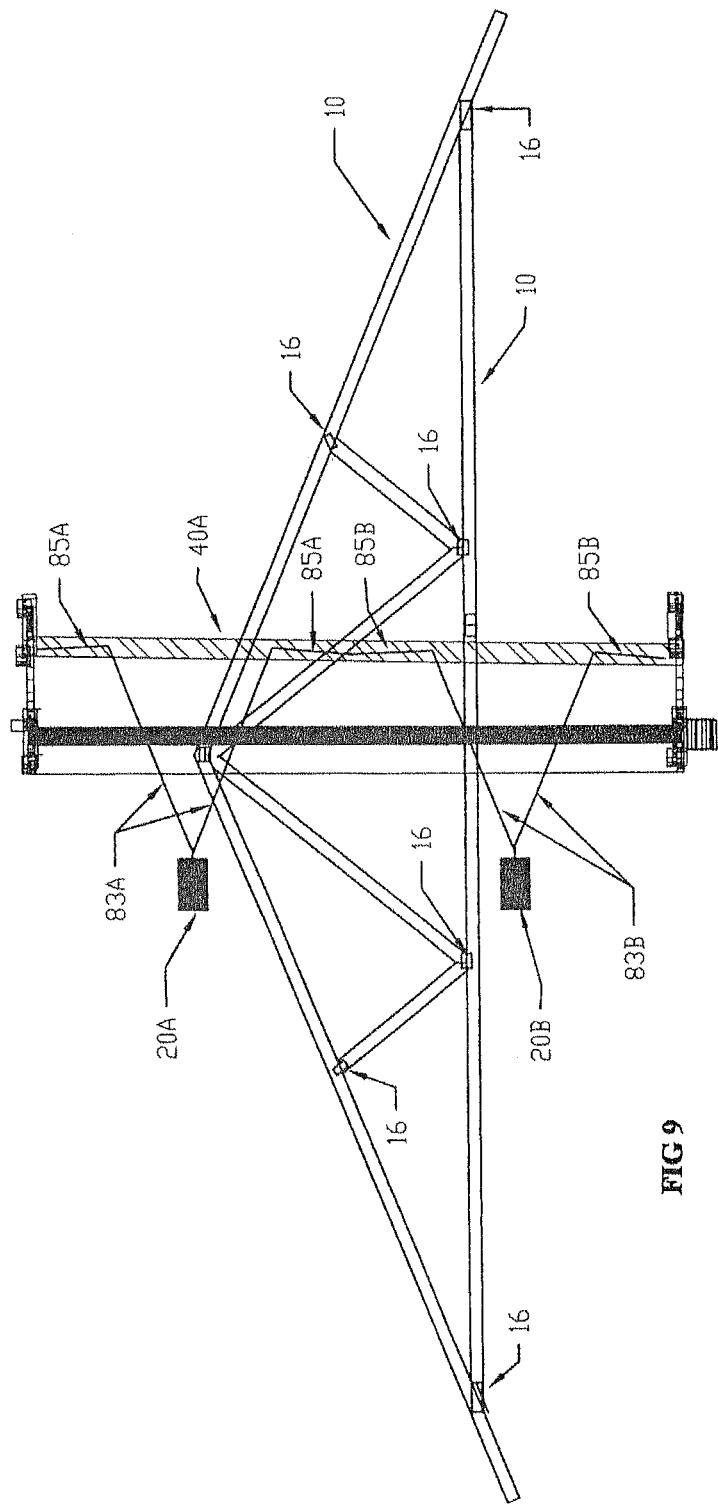

METHODS, APPARATUSES, AND SYSTEMS FOR IMAGE-BASED MEASUREMENT AND INSPECTION OF PRE-ENGINEERED STRUCTURAL COMPONENTS

CROSS-REFERENCE TO RELATED PATENT APPLICATIONS

This is a divisional of U.S. Utility patent application Ser. No. 12/012,016 filed on Jan. 30, 2008, which claims the benefit of U.S. Provisional Patent Application No. 60/898,556, filed Jan. 31, 2007, both of which are incorporated herein by reference in their entirety.

FIELD OF THE INVENTION

The present invention relates to the field of equipment for validating pre-engineered structural components, such as building trusses, wall panels, and other fabricated or composite construction parts. More specifically, embodiments of the present invention pertain to methods, apparatuses, and systems for capturing images of one or more sides of a structural component and automatically inspecting critical features of the structural component, including but not limited to, the geometry of the structural component and support plate size, placement, orientation, and the like.

DISCUSSION OF THE BACKGROUND

Building trusses and wall panels are composite structural components generally composed of multiple pieces of dimensional lumber (e.g., 2"×2", 4"×2", 4"×4", etc.) and metal support plates (e.g., gang nails, strip gang nails, nail plates, hand nail plates, etc.). Each structural component is specifically designed to support specific loads and stresses. There are unique lumber size, lumber grade, and support plate size, placement, and orientation requirements for each design. Additionally, the lumber and support plates have placement and orientation tolerances which must be met in order to ensure that the structural component can meet its engineering and design requirements. Generally, the fabrication of a structural component is a highly automated process and a number of patents exist on inventions related to fabrication including automated design, automated lumber cutting, automated layout, and automated securing of support plates into the lumber. In fabricating a structural component, the lumber and support plates are initially laid out to form the structural component, and a set of pinch rollers are used to secure the support plates into the lumber. However, it is very common for the support plates to become dislodged or misplaced before they are pressed into place by the pinch rollers. Should such defects not be discovered before installation, the structural component may not be able to support the load and stress it was designed to support, and disastrous consequences may result.

It is therefore desirable to individually inspect each structural component prior to installation in order to confirm that the size, placement, and orientation of all elements correspond to the design specifications (i.e., that the measured size, placement, and orientation is within design tolerances). Although the structural component may be manually inspected, doing so may be impractical since a particular structural component may be quite large (e.g., approximately 15 feet wide by 60 feet long) and have support plates on both sides. Further, the number of measurements and complex calculations required to validate a structural component may consume a significant amount of time and may be prone to human error. Thus, automated and/or machine validation of fabricated construction parts is desirable.

In some conventional art, machines detect missing or grossly misplaced metal support plates by utilizing "Hall effect" sensors on one or more sides of a truss (see, e.g., U.S. Pat. No. 6,100,810 and U.S. Pat. No. 6,990,384). Such implementations can only detect gross position errors of metal parts, since the detection resolution is limited by the placement density of the sensors. Thus, these machines are generally unable to detect whether the correct support plates have been installed or whether the support plates are correctly positioned within design tolerances on the lumber pieces. And since "Hall effect" sensors are not reactive to non-metallic and non-magnetic components, conventional art machines can not validate the size, placement, and/or orientation of the lumber pieces of the truss.

To solve this deficiency, other conventional art machines have included an array of photosensors and reflectors situated such that as the truss passes through the machine, the optical connection between a photosensor and a reflector is broken (similar to a convenience store door chime) (see, e.g., U.S. Pat. No. 5,506,914). These machines are also limited to identifying only a coarse outline of the truss and the gross position errors of metal parts. The visual feedback which is provided from such a machine to an operator is restricted to a rough outline. In the continuing development of the building industry, greater accuracy, reduced tolerances and/or higher inspection standards make such machines inadequate for current structural component inspection purposes.

In other industries, optical based measurement machines have been used to measure critical dimensions with great accuracy. The use of optical measurement techniques is generally preferred over contact or magnetic techniques because of their superior resolution and thus accuracy. In addition, optical measurement techniques allow for archival and retrieval of an image of a part, if needed. In one example, defects in planar-processed wood may be detected by one or more lasers (see, e.g., U.S. Pat. No. 6,336,351). However, use of such optical based measurement techniques has not been used in the structural component fabrication industry. This is partially due to the relatively large size of typical structural components which creates significant challenges not only in the construction of suitable measurement machines and devices. It is also partially due to the difficulties in capturing, storing, and processing of large amounts of optical data.

For example, using conventional approaches, optical measurement of a truss measuring 15 feet wide by 60 feet long with an accuracy of $\frac{1}{16}$ of an inch may require an image data on the order 4096×16384 pixels, resulting in approximately 67 megabytes (MB) of data for a simple black and white image. A sixteen bit gray scale image would result in 1070 MB of data. When in some applications it is desired to obtain images of both or even all sides of a truss, the amount of data would increase by a multiplicative factor. It may be also be desired to permanently store one or more images of a truss for reference at a later time. Even with the decreasing cost of data storage, saving one or more of such large images would quickly be cost prohibitive. In addition, such large data may not be efficiently processed in a reasonable time.

Individual parts of structural components may vary greatly with respect to the characteristics that can be measured using image processing. For example, trusses, wall frames and other structural components incorporate lumber and nail plates, among other things; and while the nail plates are generally produced according to very tight tolerances, the characteristics of the lumber (e.g., size, shape, etc.) may vary much more dramatically. It is therefore desirable to provide systems, methods and apparatus for measuring such structural components that take advantage of the regular nature of the nail plates while also dealing with the greater variation within the lumber.

With respect to building trusses, the very large potential sizes of the trusses require a large fabrication space. Often, this takes place outdoors and/or under a canopy that may only provide partial shade. Little additional space may be available for additional machines for inspecting the trusses. It is therefore desirable to provide reasonably sized machines that are capable of capturing precise and useful images of fabricated trusses for inspection purposes that can tolerate outdoor environments including, without limitation, significant swings in temperature as well as significant shifts in ambient lighting or brightness from full sun to relative darkness.

It is therefore desirable to provide systems, apparatuses, and methods which are capable of capturing, saving, and processing precise images of pre-engineered structural components, including but not limited to building trusses, wall panels, and other fabricated or composite construction parts, whereby the construction thereof may be efficiently and accurately verified.

SUMMARY OF THE INVENTION

Embodiments of the present invention relate to methods, apparatuses, and systems for optically validating and inspecting pre-engineered structural components, such as building frames, building trusses, wall panels, and other fabricated or composite construction parts. More specifically, embodiments of the present invention pertain to capturing images of one or more sides of a structural component and automatically inspecting critical features of the structural component, including but not limited to, the selection, size, placement, and orientation of lumber pieces and support plates.

The present invention may be used to validate and inspect structural components after they are manufactured to ensure that the critical features of the structural component, as fabricated, correspond to design tolerances. As shown in FIG. 17, a structural component 10 may be fabricated by a finish roller which secures the support plates into the lumber. Subsequent to fabrication, the structural component may be received by a system in accordance with the present invention which validates that the truss has been manufactured as designed.

Therefore, in one aspect, the invention concerns a system for inspecting a pre-engineered structural component that can include: a light source configured to illuminate a portion of the structural component; one or more cameras configured to (i) receive a reflection of the light source from the structural component and (ii) generate an image output corresponding to the reflection; a first memory storage in communication with the camera(s) configured to store the image output; a second memory storage configured to store at least one reference data, the at least one reference data corresponding to at least one reference structural component design; and a processing unit in communication with the light source, the camera(s), and the first and the second memory storage, wherein the processing unit is configured to (i) detect a characteristic of said structural component, (ii) compare the characteristic to a corresponding characteristic of the at least one reference data, and (iii) indicate a result of the comparison.

In another aspect, the invention concerns an apparatus for validating the construction of a pre-engineered structural component that can include: an emitter for projecting photons towards a portion of the structural component; a receiver for detecting a reflection of the photons from the portion of the structural component; a memory device; and a processor in communication with the emitter, the receiver, the memory device, and a program wherein the program is adapted to (i) create and compare an electronic image of the structural component to a reference image and (ii) indicate a result of the comparison.

In one aspect, the invention concerns a method of validating the construction of a pre-engineered structural component that can include: causing a light source to illuminate a first portion of the structural component, receiving a first reflection of the light source from the first portion of the structural component, and storing a first data in a first portion of a data array, wherein the first data corresponds to the intensity of the first reflection; causing the light source to illuminate a second portion of the structural component, receiving a second reflection of the light source from the second portion of the structural component, and storing a second data in a second portion of the data array, wherein the second data corresponds to the intensity of the second reflection; comparing the data array to at least one reference array, wherein the at least one reference array corresponds to at least one reference structural component design; and indicating a result of the comparison.

In another aspect, the invention concerns a method of validating the construction of a pre-engineered structural component that can include: creating at least one computer readable image of the structural component; calibrating the dimensions and orientation of the at least one image with reference to at least one support plate; selecting one of at least one reference image, the at least one reference image corresponding to at least one reference structural component design; comparing the at least one computer readable image with the selected one of the at least one reference image; and indicating a result of the comparison.

In one aspect, the invention concerns an automated system for taking images of a pre-engineered structural component that can include: a lighting enclosure comprising a proximal opening and a distal opening; at least one camera provided near the distal opening; at least one structural component detector; a processor in communication with the at least one structural component detector and the at least one camera; and a program associated with the processor, wherein the program and the processor are configured to capture, compress, store, and process at least one image received from the at least one camera In another aspect, the invention concerns a method for inspecting a pre-engineered structural component that can include: capturing images from both sides of the structural component; identifying the structural component; measuring at least one dimension of the structural component contained in the images; comparing the at least one dimension to a reference structural component design; and reporting a result of the comparison of the at least one dimension.

By optically validating a structural component, conformance with design specifications may be quickly and accurately ascertained. The compression and storage of optical data allows for efficient archival, retrieval, and processing of structural component images. The use of one or more cameras provides a basis for calibration and improved accuracy. Thus, the present invention advantageously provides an economical and efficient approach to capture, save, and process images of structural components, including but not limited to building trusses, wall panels, and other fabricated or composite construction parts. The invention may be used to measure and inspect various attributes of a structural component, including but not limited to verifying the size and placement of lumber pieces, verifying that the correct support plates have been incorporated, verifying that the placement of the support plates, and verifying the overall geometry of the structural component.

It is therefore an object of the present invention to provide machines, methods, apparatus and systems for automatically and quickly inspecting individual structural components to ensure that critical configurations, geometry and dimensions such as support plate size, support plate placement, support plate orientation and lumber quality fall within the design tolerances for the component under inspection.

It is another object of the present invention to provide machines, methods, apparatus and systems for precise inspection of the lumber and support plates of structural components by capturing image(s) of one or both sides of the component, compressing the image(s) into a manageable form, saving the compressed image(s), aligning the image(s) for positioning irregularities, comparing the image(s) with design data for the particular component under inspection, and reporting the results of the comparison.

It is another object of the present invention to provide machines, methods, apparatus and systems for capturing calibrated image(s) of one or both sides of a manufactured structural component under potentially adverse environmental conditions at the inspection site.

It is another object of the present invention to provide machines, methods, apparatus and systems for precise inspection of the lumber and support plates of structural components in which image(s) of one or both sides of the component are captured and compressed with a compression ratio that is high enough to allow the image(s) to be conveniently archived to a electronic storage device, and readily accessed for prompt processing.

It is another object of the present invention to provide machines, methods, apparatus and systems for precise inspection of the lumber and support plates of structural components in captured image(s) of one or both sides of the component that are compressed and then analyzed to identify critical areas in the component for comparison with design data.

It is another object of the present invention to provide machines, methods, apparatus and systems for capturing calibrated image(s) of one or both sides of a manufactured structural component that detects orientation of the component and compensates for any skew (mis-positioning) in comparison to the design data.

It is another object of the present invention to provide methods and apparatus for precise inspection of the lumber and support plates of structural components in which image(s) of one or both sides of the component are captured, compressed and processed quickly enough that each component may be automatically inspected as it is produced.

It is another object of the present invention to provide machines, methods, apparatus and systems for precise inspection of the lumber and support plates of structural components in which image(s) of one or both sides of the component are captured and the component design automatically identified from a paper label, bar code, stamp, mark or other identification captured in one of the images.

It is another object of the present invention to provide machines, methods, apparatus and systems for precise inspection of the lumber and support plates of structural components in which image(s) of one or both sides of the component are captured that provides visual feedback including an image and/or graphic overlay of the component under inspection in comparison with design criteria allowing for quick review and correction of defects.

These and other objects, advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 5 is a right side front perspective view of another embodiment of an apparatus in accordance with the present invention.

FIG. 6 is a left side elevational view yet another embodiment of an apparatus in accordance with the present invention.

FIG. 9 is a top view of another embodiment of an apparatus in accordance with the present invention.

DETAILED DESCRIPTION

The invention, in its various aspects, will be explained in greater detail below with regard to one or more preferred embodiments and the accompanying drawings, wherein like reference identifiers refer to similar or corresponding elements. While the invention will be described in conjunction with the preferred embodiments, the preferred embodiments themselves do not limit the scope of the invention. Rather the invention, as defined by the claims, may cover alternatives, modifications, and/or equivalents of the preferred embodiments. Similarly, the accompanying drawings do not limit the scope of the preferred embodiments and/or the invention, but rather, are illustrative of one or more examples of embodiments of the invention.

Figure 18:
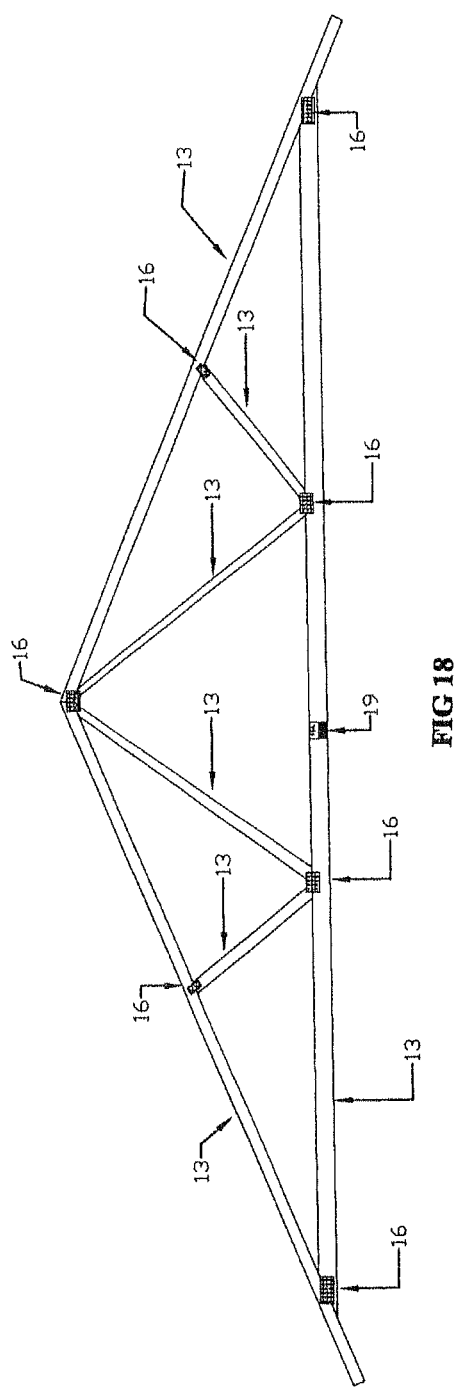
FIG. 18 is an exemplary embodiment of a structural component in accordance with the present invention.

As described in detail below, the present invention provides methods, apparatuses, and systems for image-based measurement and inspection of a pre-engineered structural component. An example of a pre-engineered structural component is shown in FIG. 18. The structural component 10 (which may be a building truss as shown, but may also be any other similar composite construction part), may include several lumber pieces 13, support plates 16, and one or more identification devices 19. The object of the invention is to create images of one or more sides of each structural component, after fabrication, in order to ensure that the correct lumber pieces 13 and support plates 16 have been installed in the correct positions. While the below discussion provides examples of apparatuses, systems, and methods for imaging the top and/or the bottom of a structural component, it can be appreciated that the invention may also be practiced to image the sides of a structural component.

An Exemplary System for Inspecting a Pre-engineered Structural Component

In some embodiments, a system for inspecting a pre-engineered structural component can include: a light source configured to illuminate a portion of the structural component; one or more camera(s) configured to (i) receive a reflection of the light source from the structural component and (ii) generate an image output corresponding to the reflection; a first memory storage in communication with the camera(s) configured to store the image output; a second memory storage configured to store at least one reference data, the at least one reference data corresponding to at least one reference structural component design; and a processing unit in communication with the light source, the camera(s), and the first and the second memory storage, wherein the processing unit is configured to (i) detect a characteristic of the structural component, (ii) compare the characteristic to a corresponding characteristic of the at least one reference data, and (iii) indicate a result of the comparison.

Figure 7A:
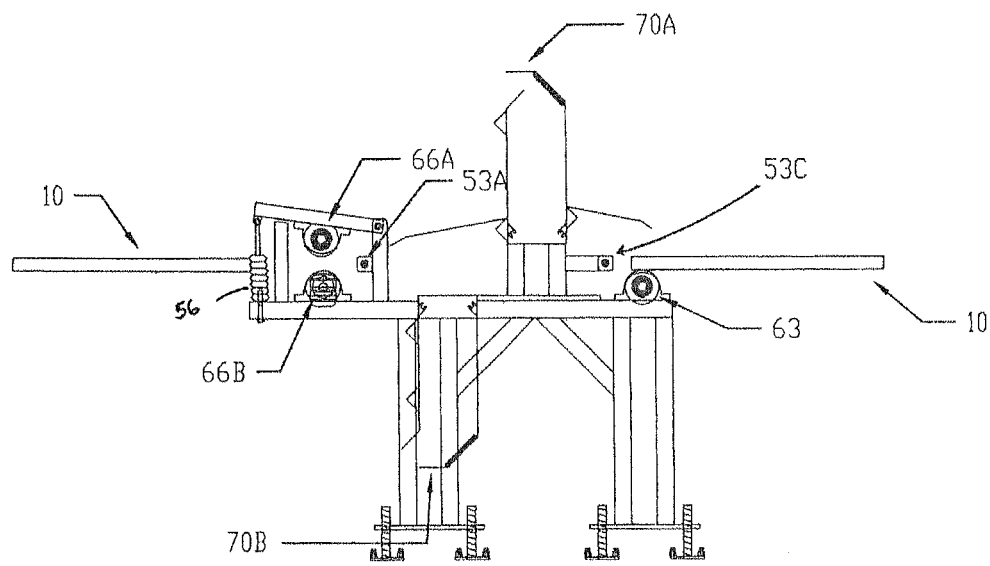
FIG. 7A is a right side elevational view of an embodiment of an apparatus in accordance with the present invention.
Figure 7B:
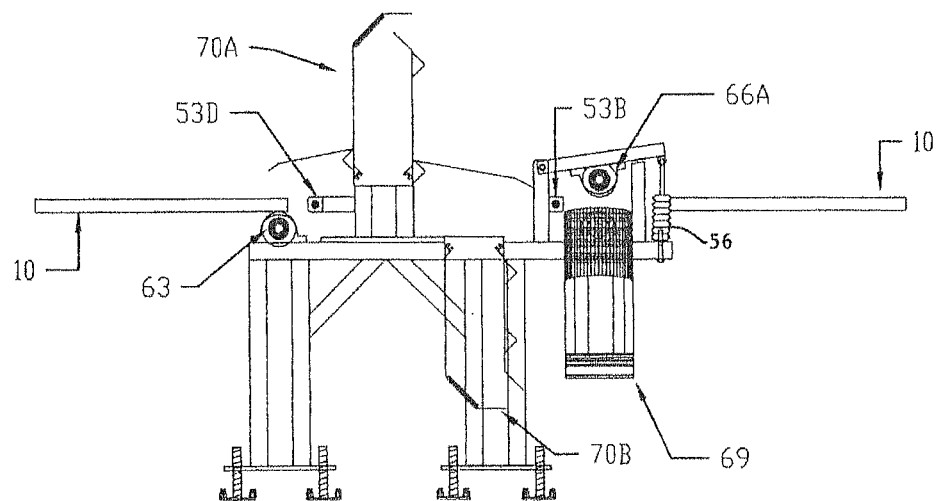
FIG. 7B is a left side elevational view of the embodiment of FIG. 7A.
Figure 12:
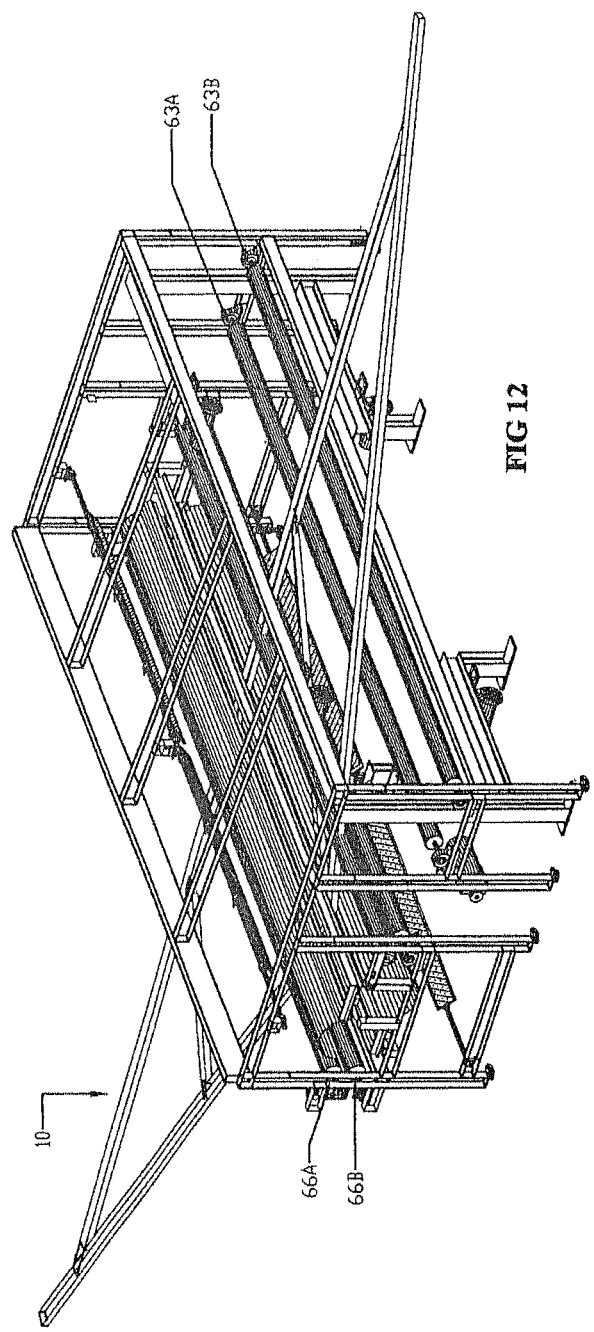
FIG. 12 is a left side front perspective view of another embodiment of an apparatus in accordance with the present invention.
Figure 13:
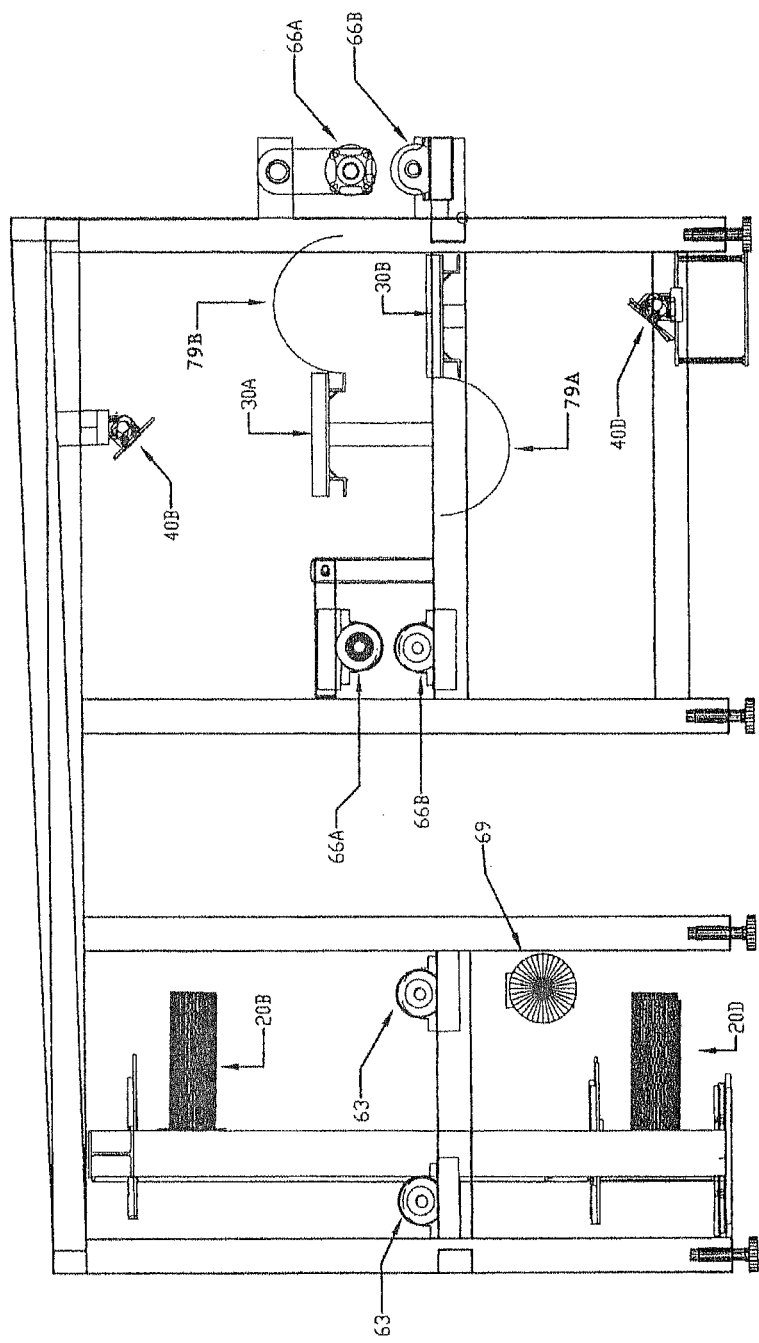
FIG. 13 is a right side elevational view of another embodiment of an apparatus in accordance with the present invention.
Figure 17:
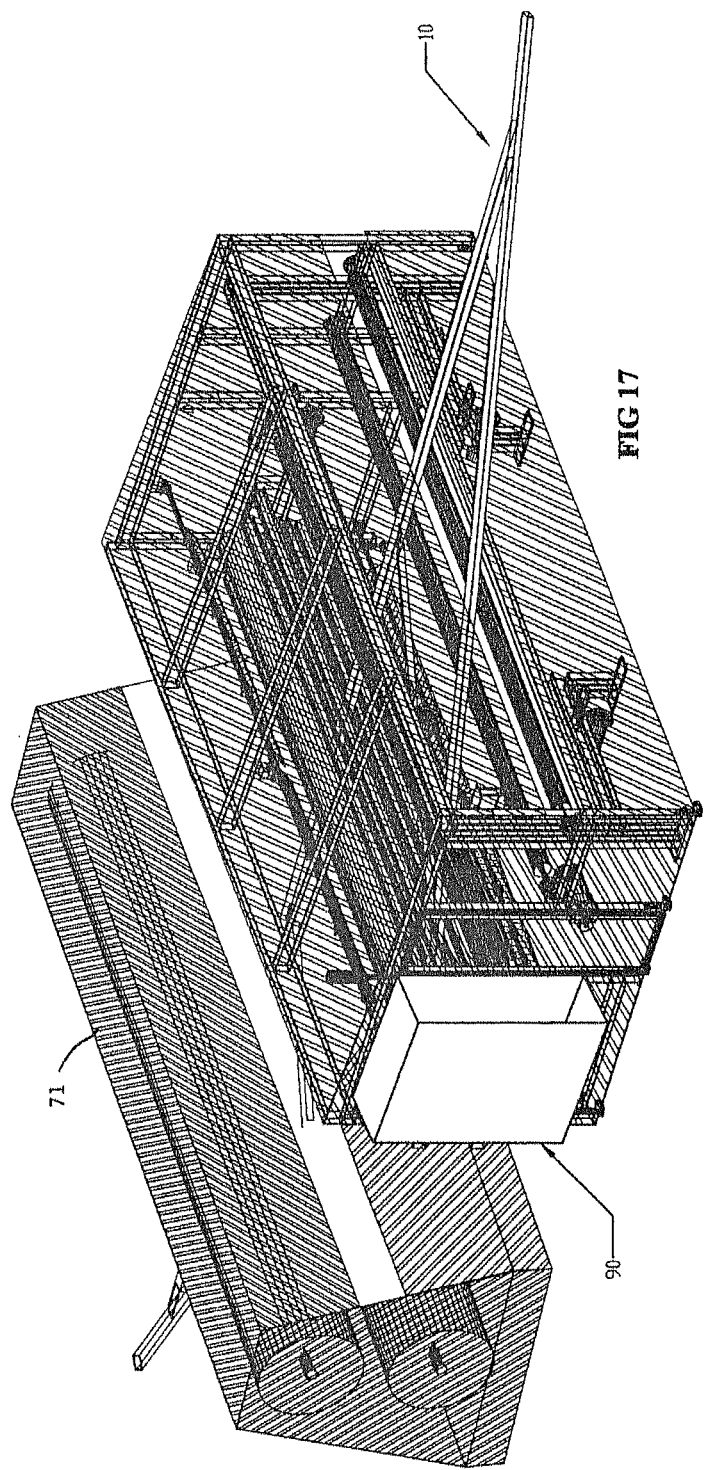
FIG. 17 is a left side front perspective view of an embodiment of a system in accordance with the present invention.

As shown in the exemplary embodiment of FIG. 12, a structural component 10 may be placed at one end of the system. The system may include one or more drive rollers 66A and 66B and one or more support rollers 63A and 63B and may be configured to move the structural component 10 from one side of the system to another. The structural component 10 can be pressed between drive rollers 66A and 66B to move the structural component 10 while support rollers 63A and 63B provide support for the structural component. In some implementations, the system can include a motorized roller for moving the structural component from a first position to a second position. As illustrated in the example of FIG. 17, the finish (or pinch) roller 71 may include one or more motorized rollers which cause the structural component 10 to move through the system. In another example, and as shown in FIG. 13, the system may include a motor 69 for powering at least one of drive rollers 66A and 66B. It is to be appreciated that one or all of drive rollers 66A and 66B may be motorized. For example, drive rollers 66A and 66B may be both be motorized. Alternatively, drive roller 66A may be motorized and drive roller 66B may prevent vibration and/or damping of the structural component movement so that clear images of the truss may be captured. In another and similar example, and as shown in FIGS. 7A and 7B, the system may include drive rollers 66A and 66B, support roller 63, and motor 69. Other combinations of motorized and non-motorized rollers are also contemplated within the scope of the invention. Although not shown, it can be appreciated that the transport system may also include a conveyor belt configured to move the structural component 10 from one side of the system to another.

In some implementations, the system may include two or more edge sensors for detecting a leading and a trailing edge of the structural component. Such edge sensors may be any type of sensor, including but not limited to optical, photo, and magnetic sensors. As shown in the embodiments of FIGS. 7A and 7B, the system may include an exemplary optical first edge sensor transmitter/receiver pair 53C & 53D for detecting a leading edge of the structural component 10 as it moves through the system assisted by drive rollers 66A and 66B and support roller 63. The system may also include an optical second edge sensor transmitter/receiver pair 53A & 53B for detecting a trailing edge of the structural component 10. In some embodiments, the edge sensors may be used to control the operation of the drive rollers 66A and 66B. In other embodiments, the edge sensors may be used to control the operation of the light source and/or the camera(s).

In some implementations, the system may include an encoder configured to (i) detect the position of the structural component relative to the camera(s) and (ii) generate a position output corresponding to said position. As shown in FIG. 7A, embodiments may include an encoder 56 which can be used to determine the position of the structural component 10 and to coordinate the timing and speed of travel of the structural component 10 with the image that is captured by the camera(s). Referring to the exemplary embodiments of FIGS. 6, 7A, and 7B, the encoder may be a standalone encoder not coupled to drive rollers 66A and 66B or support roller 63. For instance, the encoder may be included in the finish (or pinch) rollers 71 which secure the support plates into the lumber pieces of the structural component (as illustrated in FIG. 17). However, in other embodiments the encoder may be included in an assembly of drive roller 66A or 66B, or it may be included in an assembly of motor 69. Alternatively, the encoder 56 may be a separate device. The resolution of the encoder 56 is to be chosen with respect to the minimum resolution of the desired image. For example, if the minimum feature size necessary to validate and inspect the structural component is $1/16$th of an inch, an encoder having a resolution of $1/32$th of an inch may be used. Encoders with other suitable resolutions are also contemplated within the scope of the invention.

As shown in the exemplary embodiment of FIG. 6, light source 30A and light source 30B may be configured to illuminate a first side of the structural component 10 at a location which is desired to be imaged. Preferably, the light source is configured to focus light uniformly along a narrow strip on the structural component 10. For example, in some embodiments, the light source may be an elongated bar. Additional or alternative light sources may be configured to illuminate a second side of the structural component 10, for example, when it is desired to image both the top and the bottom side of the structural component. It is to be appreciated that single or multiple light sources may be provided on either side of the structural component 10. In another exemplary embodiment, and as shown in FIG. 13, a first light source 30A may be configured to illuminate a first side (i.e., the top side) of a structural component and a second light source 30B may be configured to illuminate a second side (i.e., the bottom side) of the structural component. It is to be appreciated that the location and number of light sources used included in the present invention are to be chosen so as to sufficiently illuminate the one or more portions of the structural component to be imaged.

Although any suitable type of light source may be selected, it is to be appreciated that the color of light emitted by the light source should be complementary to the color of light which can be received by the camera(s). For example, the light source can be configured to emit visible light and the camera(s) can also be configured to receive visible light. In other embodiments, the light source can be configured to emit ultraviolet light and the camera(s) can also be configured to receive ultraviolet light. It can be appreciated that in addition to the type of camera selected, the selection of light color may depend on the type of wood and metal used in the structural component (i.e., a particular color of light may be better for imaging Douglas Fir and another color of light may be better for imaging Yellow Pine; a particular color of light may be better for imaging aluminum and another color may be better for imaging iron). The selection of light color may also depend on the amount of processing to be performed on the images. It is also to be appreciated that multiple combinations of light source(s) and camera(s) can be used. For example, a system can include a first light source and a first camera for operation in the visible light spectrum and a second light source and a second camera for operation in the ultraviolet spectrum.

In some implementations, the light source can be configured to emit radiation having a narrow chromatic bandwidth. For example, light sources 30A and 30B may be light emitting diodes (LEDs) which emit light in the red spectrum. In another example, light sources 30A and 30B may be neon lights which emit light in the yellow spectrum. In other implementations, the light source can include at least one optical filter. For example, light sources 30A and 30B may be composite devices which are made of multi-chromatic emitters and one or more optical filters for blocking one or more spectral ranges (i.e., light sources 30A and 30B may include standard fluorescent bulbs and red optical filters). In another exemplary embodiment, light source 30A may include a standard florescent bulb and a filter assembly having both a red optical filter and a yellow optical filter. A mechanized means may configure one or more filters to be placed between the structural component and the bulb. Similarly, the light sources 30A and 30B may include an array of multi-color LEDs and the processor may dynamically change the spectral characteristics of the light incident on the structural component. It is to be appreciated that multiple combinations of different light sources, colors and/or filters are within the scope of the present invention, the selection of the particular combination being driven by such factors as, without limitation, the type of material from which the structural component is made, the lighting environment in which the invention is used, the type of camera(s) used, the resolution desired for the images produced, and other similar factors.

Figure 10A:
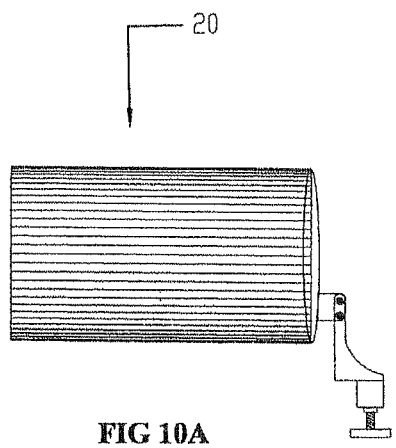
FIG. 10A is an enlarged side view of an exemplary embodiment of a camera in accordance with the present invention.
Figure 10B:
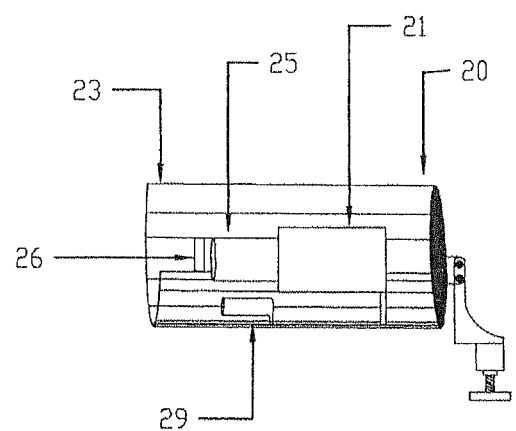
FIG. 10B is a cut-away view of the embodiment of FIG. 10A.

An embodiment of a single exemplary camera is shown in FIGS. 10A and 10B. As above, the light source and the camera function together so as to create detailed images of the structural component. Thus, in some implementations, the camera may be configured to receive radiation having a narrow chromatic bandwidth. The camera may be configured to receive light in the same spectrum band as that emitted by the light source or as filtered by a light source filter or, the camera may be configured to receive light in a different spectrum band. For example, the light source may be configured to emit a broad spectrum of light while the camera may be configured to receive a narrow spectrum. In some implementations, the camera can include at least one optical filter. The optical filter may be chosen to be complementary to the spectrum of light emitted by the light source. In other implementations, the camera can include an environmental housing. Camera 20 can include an image sensor 21, an environmental housing 23, a lens 25, an optical filter 26, and/or a positioning laser 29. The positioning laser 29 may be used to position the view of the camera 20. The resolution of the image sensor 21 may be chosen with reference to the dimensions of the structural component and the desired image resolution. For example, and referring to FIG. 15, if the structural component has a width of 10 feet and it is desired to resolve the structural component to 1/16 inch per pixel, each camera 20A, 20B, 20C, and 20D can have a resolution of 1024 pixels. However, if the desired image resolution is 1/32 of an inch, or, if only one camera is used per side instead of two, the image sensor must have a resolution of 2048 pixels. It is to be appreciated that multiple cameras may be used in the present invention, and that the various implementations described herein with respect to single camera embodiments (lenses, filters, positioning lasers, etc.), as well as different combinations of those implementations, may be utilized in multiple camera embodiments as well.

Figure 19:
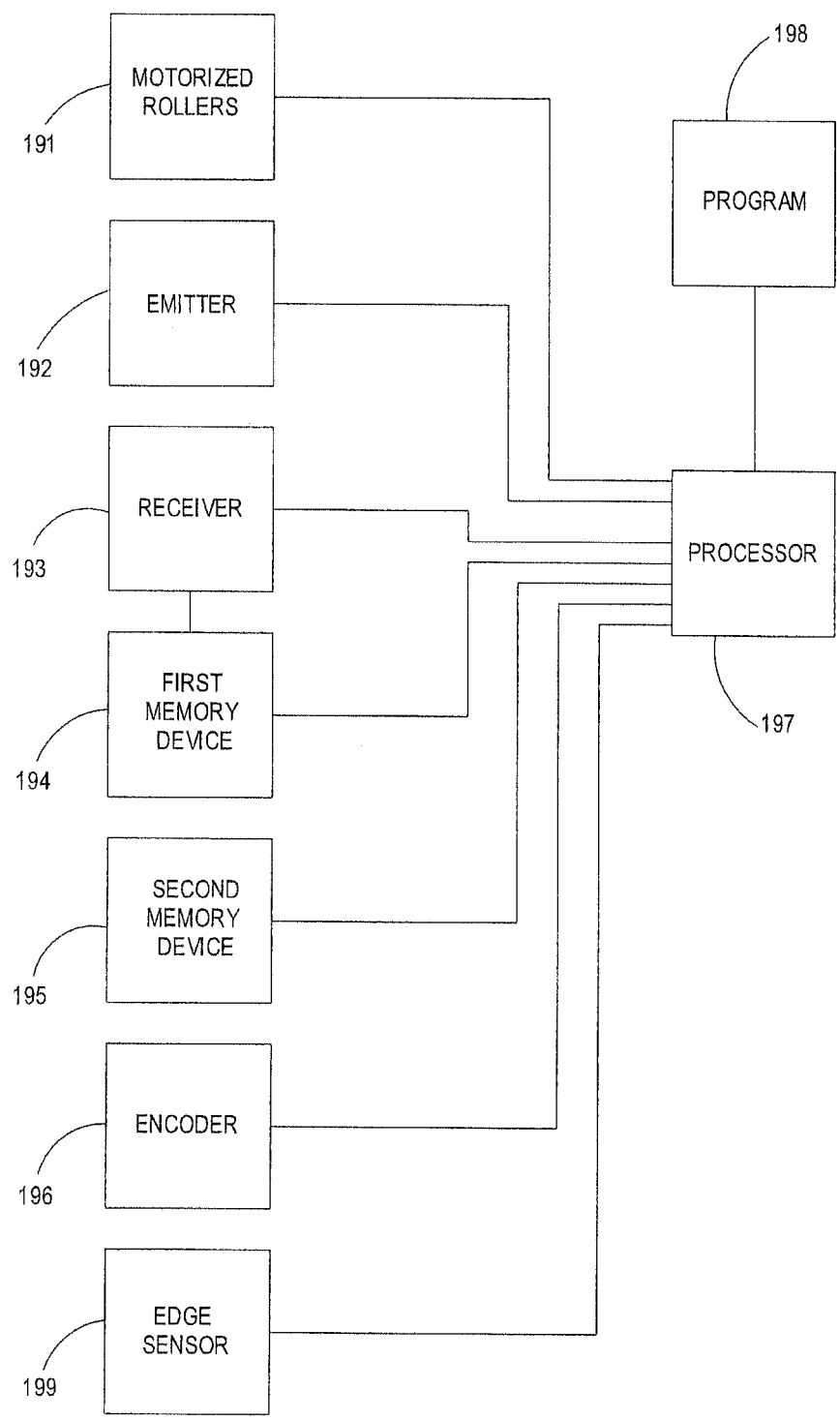
FIG. 19 is an exemplary embodiment of a schematic in accordance with the present invention.

Each of the camera(s), light source(s), first memory storage, and second memory storage may be coupled to a processing unit. In some exemplary embodiments, the processing unit may also be coupled to one or more motorized rollers, the encoder, and/or one or more edge sensors. For example, and referring now to the diagrammatical embodiment of FIG. 19, a processing unit 197 may be coupled to motorized rollers 191, a light source 192, a camera 193, a first memory storage 194, a second memory storage 195, an encoder 196, and an edge sensor 199. The first memory storage 194 may be coupled to the camera 193 for storing an output image file. The second memory storage 195 may be configured to contain one or more reference data (for example, data corresponding to a reference structural component design). The processing unit 197, first memory storage 194, and second memory storage 195 may be physically located near the other components in the system. For example, they could each be located in a control unit 90 as shown in FIG. 17. Alternatively, the first memory storage 194 may be located in control unit 90 and the processing unit 197 and the second memory storage 195 may be located on another device (for example, a computer networked to the control unit 90). It is to be appreciated that FIG. 19 represents only an exemplary embodiment of the invention, and that other configurations, placements and/or combinations of the elements of FIG. 19 are also contemplated by the present invention.

In some embodiments, the processing unit 197 may be configured to detect a characteristic of the structural component (as reflected by the image file stored the first memory storage). In some implementations, the characteristic can be selected from the size of, the shape of, the color of, the absolute position of, and/or the relative position of at least one of a lumber piece, a support plate, and/or an identification device. For example, the system may be configured to detect the absolute position of a lumber piece or the shape of a support plate. In some embodiments, the processing unit may also be configured to detect a corresponding characteristic of one or more reference structural component designs (as reflected by the reference data which may be stored in the second memory storage). In some embodiments, the processing unit may be configured to then compare the characteristic of the structural component to the characteristic of one or more reference designs and indicate a result of the comparison. For example, the processing unit can detect the size and relative position of a support plate contained in the image file of the structural component. In some embodiments, the processing unit can then compare the size and relative position of the detected support plate to the location and orientation of a corresponding support plate (as reflected by the reference structural component design). If the size and relative position of the detected support plate is within design tolerances (for example, no more than 1/64 of an inch off in the X direction and 1/64 of an inch off in the Y direction) as may be provided for in the reference structural component design, the processing unit can indicate that the support plate has passed inspection. The processing unit can continue to perform the comparison operations on other support plates of the structural component, or, if all comparisons have completed, can indicate whether or not the structural component has been validated. The result of the comparison can be indicated in any suitable fashion, such as without limitation, through an audio or visual alarm or signal, on a monitor attached to the processing unit, and/or this may be indicated by storing a value in a data array.

In other implementations, the system can include a reflective surface. In one example, and referring to FIG. 13, light source 30A can be configured to illuminate a top side of a structural component (not shown). A reflective surface 40B may be configured to reflect an image from the top side of the structural component to camera(s) 20B. Similarly, reflective surface 40D may be configured to reflect an image from the bottom side of the structural component to camera(s) 20D. In another example, and referring to FIG. 6, light sources 30A and 30B may be configured to illuminate a top side of the structural component 10. Reflective surface 40A may be configured to reflect an image from the top side of the structural component 10 to camera(s) 20A. Although the reflective surface as shown is a mirror, in other implementations, the reflective surface can be any suitable material, for example, one side of a multi-sided prism.

Figure 15:
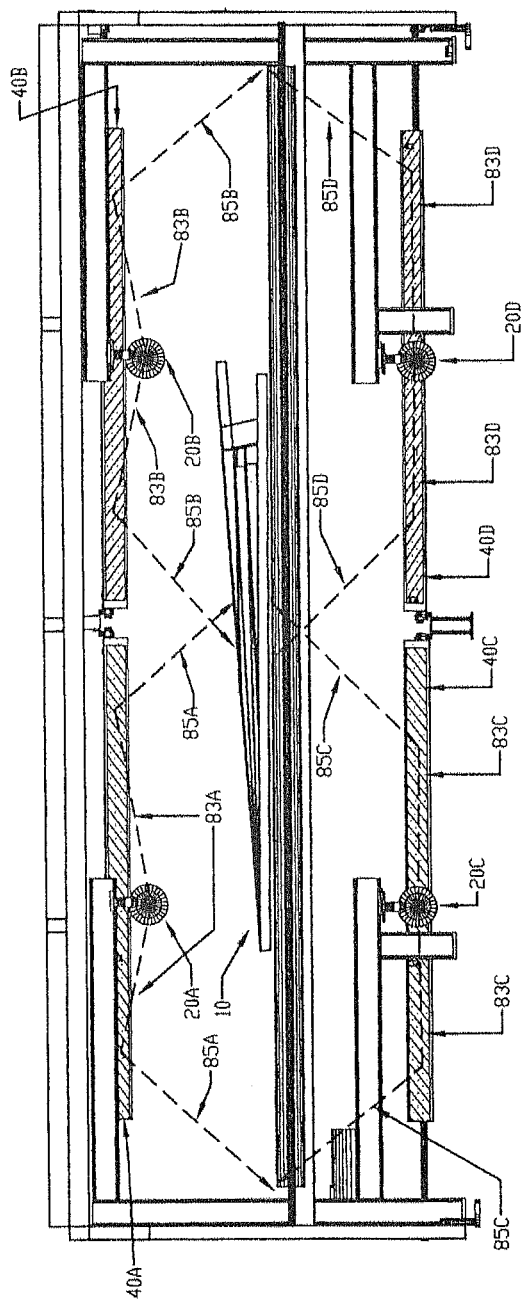
FIG. 15 is another front end elevational view of the embodiment of FIG. 14
Figure 16:
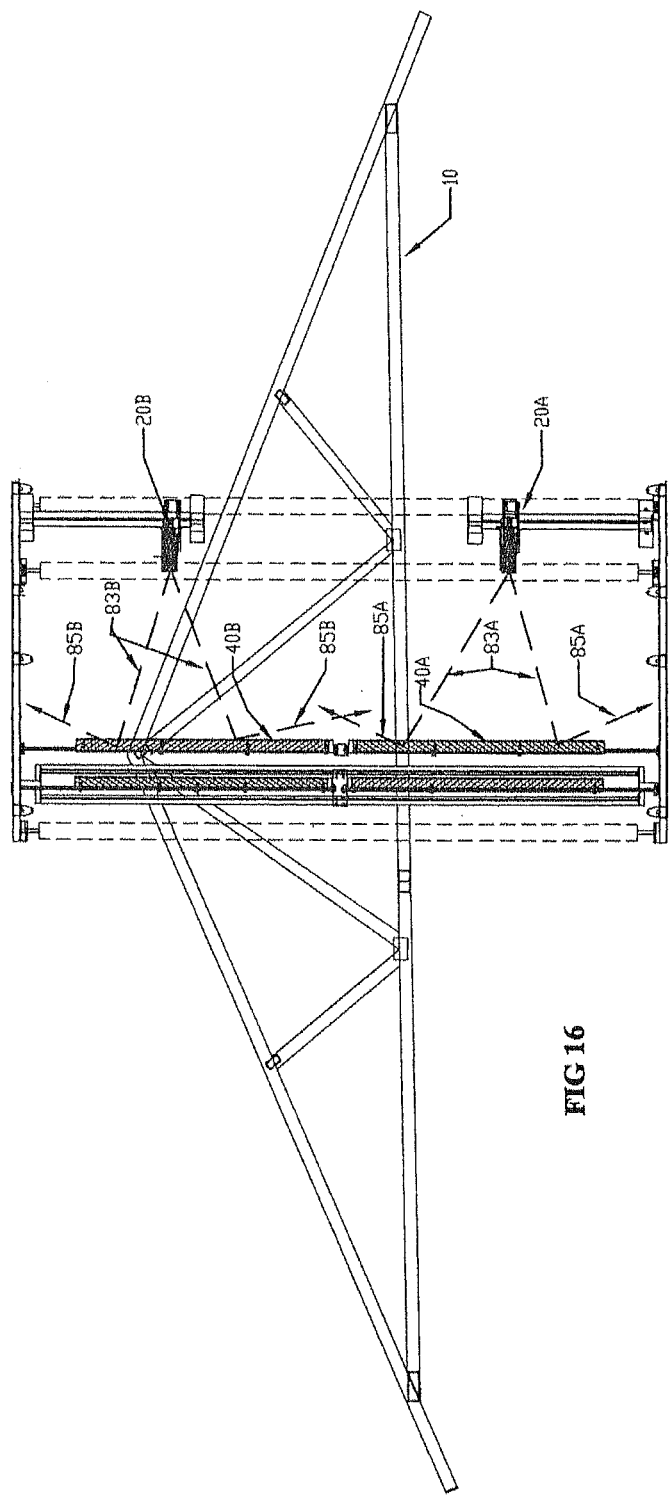
FIG. 16 is a top view of another embodiment of an apparatus in accordance with the present invention.

In some implementations, the system can include (i) a first optical path from the structural component to the reflective surface and (ii) a second optical path from the reflective surface to the camera(s). Referring to the exemplary embodiment of FIG. 14, the system can include cameras 20A, 20B, 20C, and 20D for imaging the top and the bottom sides of a structural component. The system may also include reflective surfaces 40A, 40B, 40C, and 40D which correspond to camera 20A, 20B, 20C, and 20D, respectively. As shown in the exemplary embodiment of FIG. 15, the relative size, number, and placement of reflective surfaces and the number and placement of cameras create, for each camera, a first optical path 85A, 85B, 85C, and 85D from the structural component 10 to the reflective surfaces 40A, 40B, 40C, and 40D, respectively, and a second optical path 83A, 83B, 83C, and 83D from the reflective surfaces 40A, 40B, 40C, and 40D to the cameras 20A, 20B, 20C, and 20D, respectively. It is to be appreciated that different combinations and/or numbers of reflective surfaces 40 and of cameras 20 defining different optical paths 83, 85 are contemplated within the scope of the present invention. As shown in the exemplary embodiment of FIG. 16, the second optical path 83A can have an envelope defined by the view of the camera 20A and may extend from the camera 20A to the reflective surface 40A. In these exemplary embodiments, the first optical path 85A further reflects the camera view from reflective surface 40A to the structural component 10. In another exemplary embodiment, and as shown in FIG. 6, the system can include a camera 20A and a reflective surface 40A. This exemplary system can include a first optical path 85A from the structural component 10 to the reflective surface 40A and a second optical path 83A from the reflective surface 40A to the camera 20A. Referring now to the exemplary embodiment of FIG. 8, a second optical path 83A may have an envelope defined by the view of camera 20A and may extend from the camera 20A to the reflective surface 40A. In these embodiments, the first optical path 85A may further reflect the camera view from reflective surface 40A to the structural component 10. It is to be appreciated that depending on the number, placement, and configuration of one or more cameras, different systems in accordance with the present invention can include any number of reflective surfaces. For example, as shown in FIG. 9, a single reflective surface 40A may be selected to reflect an image of the top side of the structural component 10 to both cameras 20A and 20B. Alternatively, and as shown in FIG. 16, the system can include a first reflective surface 40A configured to reflect a first portion of the top side of the structural component 10 to camera 20A and a second reflective surface 40B to reflect a second portion of the top side of the structural component 10 to camera 20B.

It is to be appreciated that the distance between the structural component and the reflective surface(s), the distance between the reflective surface(s) and the camera(s), the number of reflective surfaces and cameras, and the field of view of the cameras may be varied, but are interrelated. For instance, the greater the distance between the structural component and the reflective surface (i.e., the first optical path) the shorter the distance required between the reflective surface and the camera (i.e., the second optical path). In another example, the distance between a camera and the reflective surface (i.e., the second optical path) may be shorter when multiple cameras are used to image a single side of a structural component. As shown in the two camera example of FIG. 16, the envelope of the total optical path of the camera 20A (including the first optical path 83A and the second optical path 85A as reflected by reflective surface 40A) must at a minimum spread across one half of the structural component 10. If three cameras instead of two are used to image the top side of the structural component, each camera would at a minimum need to spread across one third of the structural component. In the preferred embodiments, the total optical paths of the cameras overlap slightly so that no imagery is lost. As can be appreciated, the use of a greater number of cameras to image one side of the structural component may decrease the distance needed between the cameras and the reflective surface and/or the distance between the structural component and the reflective surface. It is to also be appreciated that the camera configurations, the distances between the cameras and the reflective surfaces, and the distances between the reflective surfaces and the structural components are side dependent (i.e., the top side configuration may be different than the bottom side configuration).

While some structural components may be manufactured indoors, there are many applications where they are manufactured outdoors on a construction site. It may be desired to shield such apparatuses and systems from dust, dirt, debris, and weather. Furthermore, because the present invention provides methods, apparatuses, and systems for image-based measurement and inspection of the structural components, it can be appreciated that the apparatuses and systems in accordance with the present invention may need to consider and compensate for any adverse effects of external lighting. The intensity and wavelength of the internal light sources may be configured to swamp any remaining external light and to allow a better image to be captured by the camera. Thus in some applications, the system may be configured to block a substantial amount of stray, external, and/or ambient light so as to protect the optical integrity of the system and to provide for more detailed and precise imaging.

Accordingly, in some implementations, the system can include an enclosure for housing the light source(s), the reflective surface(s), and the camera(s). As shown in FIG. 17, the light source(s), reflective surface(s), and camera(s) may be housed in an enclosure for protecting these elements from damage due to dust, dirt, debris, weather, and other environmental contaminants. However, in some applications, it may be impractical to provide such an enclosure for housing each of the light source(s), reflective surface(s), and camera(s). Thus, in other implementations, the system can include a light source housing for housing only the light source(s) and the reflective surface(s). Referring now to the exemplary embodiment of FIG. 5, a system may include a first light source housing 70A for housing a light source and a reflective surface corresponding to the top side of a structural component 10 (i.e., the top side to be imaged by cameras 20A and 20B). The system may also include a second light source housing 70B for housing a light source and a reflective surface corresponding to the bottom side of a structural component 10 (i.e., the bottom side to be imaged by cameras 20C and 20D. Light source housings 70A and 70B may be mounted above and below, respectively, the path of the structural component 10 as it moves through the system. It is to be understood and appreciated that both light source housing 70A and 70B can be provided in applications for imaging both sides of the structural component 10. However, in applications for imaging only the top side of the structural component 10, the system may include only light source housing 70A. Similarly, in applications for imaging only the bottom side of the structural component 10, the system may include only light source housing 70B.

Figure 11:
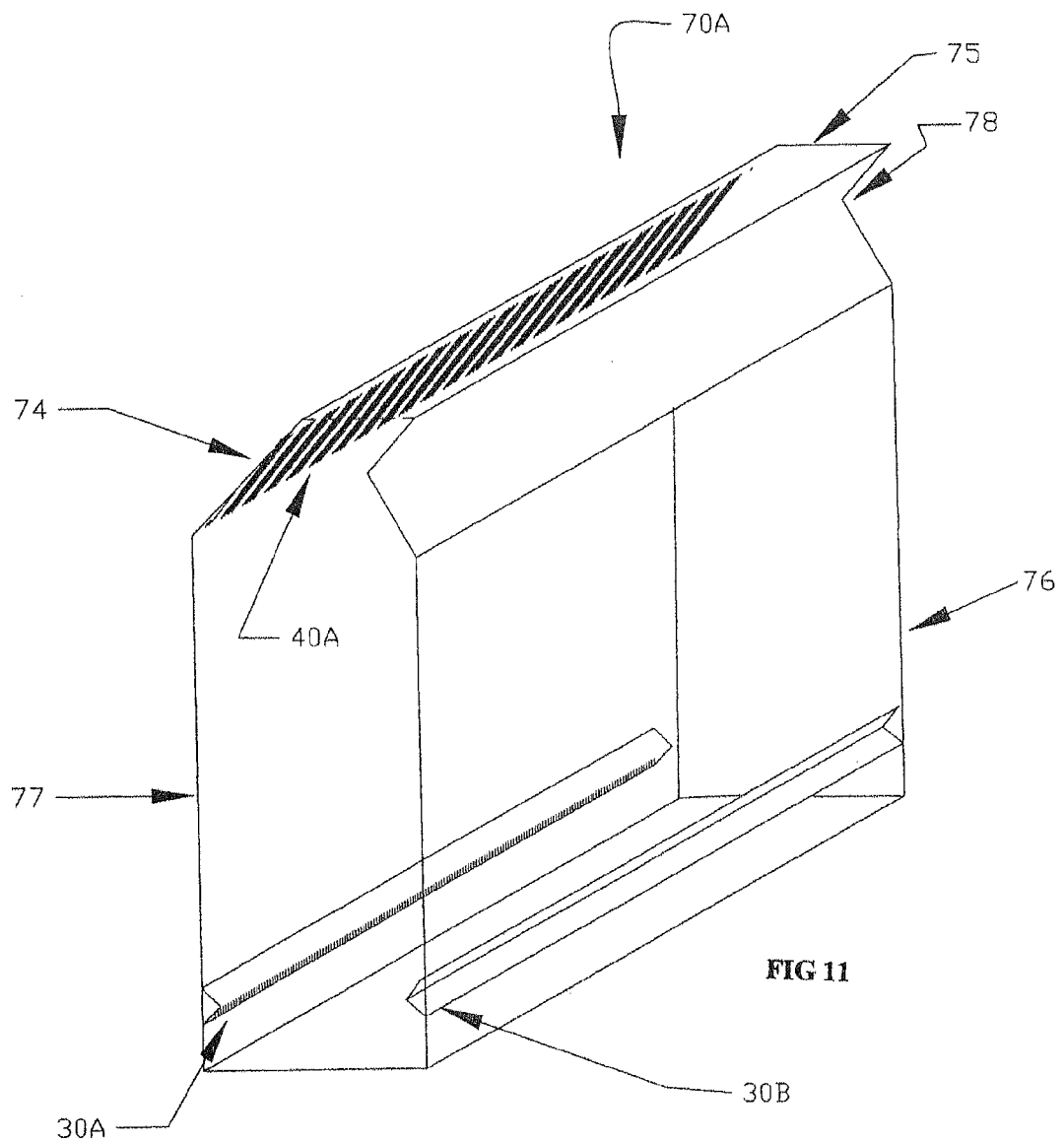
FIG. 11 is a cut-away view of an exemplary embodiment of a light source housing in accordance with the present invention.

The details of an exemplary embodiment of a light source housing are shown in FIGS. 6 and 11. While the following discussion is made with reference to an upper light source housing 70A, it is to be appreciated that lower light source housing 70B may have similar features and structures, and may differ only in the orientation relative to the structural component as shown. In some embodiments, light source housing 70A can include an elongated front wall 76, an elongated back wall 77, and an elongated top wall 75. An opening 78 is provided between front wall 76 and top wall 75. In some embodiments, the left and right sides of the light source housing 70A may be closed off by walls to minimize the entry of debris or unwanted foreign matter. Alternatively, the sides may be left open to provide an access point to the interior of the light source housing 70A. In some implementations, the light source housing can have a uniform interior color. For example, the light source housing can have an interior that is uniformly painted black to minimize any light reflections.

In some embodiments, light sources 30A and 30B may be provided on the inside of light source housing 70A. In these embodiments, light sources 30A and 30B are configured to illuminate a portion of the structural component 10 passing below light source housing 70A. One or more flaps 72 may be hingedly attached to the back wall 77 and/or front wall of light source housing 70A to provide additional protection against stray and/or ambient light from illuminating the same portion of the structural component 10 as light sources 30A and 30B illuminate. One or more reflective surface(s) 40A may be provided in the interior of light source housing 70A on a support wall 74, as shown. Alternatively, reflective surface(s) 40A may be provided on rear wall 77 or top wall 75. Reflective surface 40A may be fixed or adjustable and may be angled such that a reflection of light source 30A and 30B from structural component 10 may further be reflected by reflective surface 40A, though opening 78, and received by camera 20A. In the exemplary embodiment of FIG. 6, camera 20A may be situated parallel to structural component 10 and light source housing 70A may be configured perpendicular to structural component 10. In such case, it is preferred that reflective surface 40A be configured at an angle of approximately 45 degrees. However, it can be appreciated that camera 20A and light source housing 70A may be configured in many different angles relative to the structural component 10, and as such, reflective surface 40A should be configured at an appropriate angle sufficient to reflect an image of the structural component 10 to camera 20A.

An Exemplary Apparatus for Validating the Construction of a Pre-engineered Structural Component In some embodiments, an apparatus for validating the construction of a pre-engineered structural component can include: one or more emitters for projecting photons towards a portion of the structural component; one or more receivers for detecting a reflection of the photons from the portion of the structural component; a memory device; and a processor in communication with the emitter(s), the receiver(s), the memory device, and a program wherein the program is adapted to (i) create and compare an electronic image of the structural component to a reference image and (ii) indicate a result of the comparison.

Referring to FIGS. 6, 7A, and 7B, embodiments of an apparatus can include one or more emitters 30A and 30B configured to project photons towards a portion of a structural component 10. The photons may reflect off of a portion of the structural component 10 and be received by receiver 20A. In some implementations, the apparatus can include a means for moving the structural component with respect to the receiver. The means can include drive rollers 66A and 66B, a motor 69 for imparting force on one or both drive rollers 66A and 66B, and support roller 63A. Alternatively, the means can include drive rollers 66A and 66B (which are not motorized) support roller 63A. In such an example, force may be exerted on the structural component by one or more motorized rollers within a finish (or pinch) roller 71 assembly (as shown in the example of FIG. 17). In some implementations, the apparatus can include an encoder for detecting the position of the structural component with respect to the receiver. An encoder 56 may be provided to detect the position of the structural component 10 with respect to the receiver 20A (and associated optical paths 83A and 85A). The encoder can be a stand alone encoder (i.e., the encoder 56 as shown in FIGS. 6, 7A, and 7B), or, the encoder can be part of an assembly of either the drive rollers 66A or 66B, the support roller 63A, or the finish (or pinch) roller 71. In some implementations, the apparatus can include one or more sensors for detecting an edge of the structural component. For example, one sensor pair 53C and 53D may be provided for detecting a leading edge of the structural component 10 and another sensor pair 53A and 53B may be provided for detecting a trailing edge of the structural component 10. It is to be appreciated that different combinations of sensors are contemplated within the scope of the invention.

As shown in the exemplary embodiment of FIG. 19, the apparatus can include a processor 197 in communication with the emitter 192, the receiver 193, the memory device 194, and a program 198. The program 198 may be adapted to, with reference to the receiver 193, create an electronic image of the structural component. The processor 197 can also be in communication with the encoder 196 for coordinating the timing of the structural component as it moves through the apparatus. It can be appreciated that the encoder 196 may also be in direct communication with the receiver 193. In another exemplary embodiment, the processor 197 may also be in communication with the means 191 for moving the structural component with respect to the receiver and the sensor 199 for detecting an edge of the structural component. For example, the processor 197 and/or program 198 can be configured to activate one or more motorized rollers, the emitter, and/or the receiver in response to sensor 199 (which may indicate that the structural component is in position and ready to be imaged).

Program 198 may be configured to create an electronic image of the structural component and store the image in memory 194. Memory 195 may contain one or more reference images (which correspond to reference structural component designs). The program 198 may be further configured to compare the image stored in memory 194 to one or more reference images stored in memory 195 (e.g., the program can compare the size and relative location of one or more support plates contained in the image of the structural component to the size and the relative location of one or more support plates contained in one or more reference images). The program 198 may be configured to indicate a result of the comparison, for example, by activating a light or alarm, changing the display on a monitor, or storing data in an electronic file or on a networked computer.

In some implementations, the apparatus can include at least one reflective surface configured to create (i) a first optical path from the structural component to the at least one reflective surface and (ii) a second optical path from the at least one reflective surface to a receiver. Referring back to the exemplary embodiment of FIG. 6, the apparatus can include a reflective surface 40A configured to create a first 85A and a second 83A optical path. The first optical path 85A may extend from the structural component 10 to the reflective surface 40A. The second optical path 83A may extend from the reflective surface 40A to the receiver 20A.

An Exemplary Method of Validating the Construction of a Pre-engineered Structural Component In some embodiments, a method of validating the construction of a pre-engineered structural component can include: causing a light source to illuminate a first portion of the structural component, receiving a first reflection of the light source from the first portion of the structural component, and storing a first data in a first portion of a data array, wherein the first data corresponds to the intensity of the first reflection; causing the light source to illuminate a second portion of the structural component, receiving a second reflection of the light source from the second portion of the structural component, and storing a second data in a second portion of the data array, wherein the second data corresponds to the intensity of the second reflection; comparing the data array to at least one reference array, wherein the at least one reference array corresponds to at least one reference structural component design; and indicating a result of the comparison.

Figure 20:
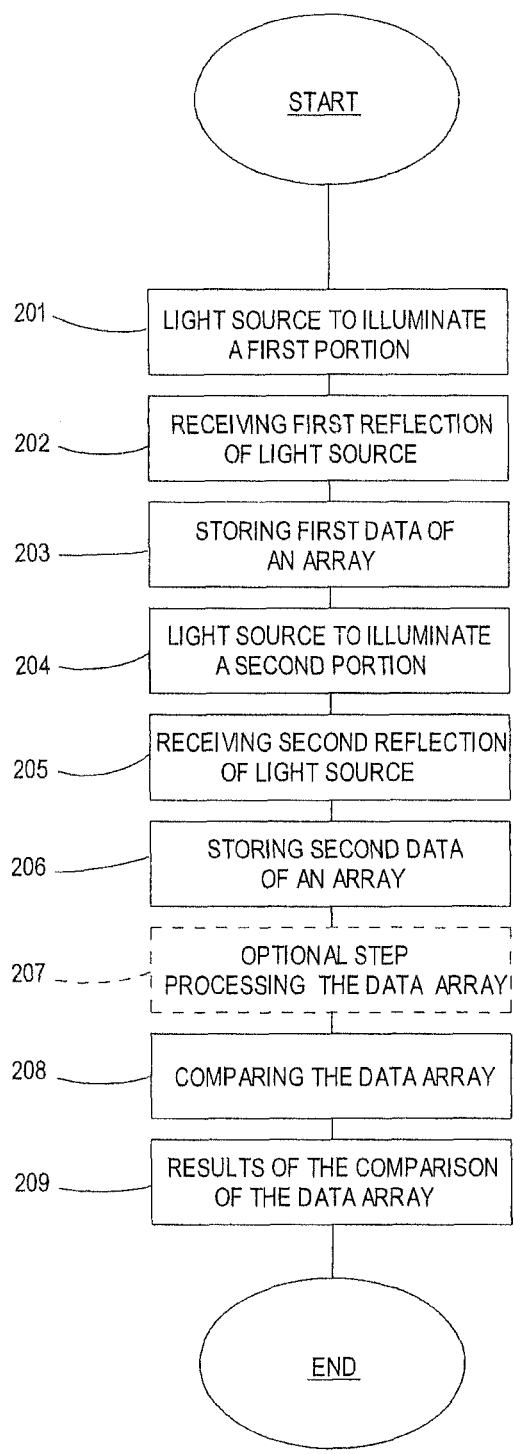
FIG. 20 is a diagram showing an embodiment of a method of validating the construction of a structural component in accordance with the present invention.

Referring now to FIG. 20, methods of the invention can include the step 201 of causing a light source to illuminate a first portion of the structural component. For example, and as illustrated in FIG. 6, light sources 30A and 30B can be activated so that a first portion of the structural component 10 is illuminated. These methods can include the step 202 of receiving a first reflection of the light source from the first portion of the structural component. For example, a first reflection of the light sources 30A and 30B can be received by camera 20A. The methods can also include the step 203 of storing a first data in a first portion of an array. For example, and as shown in FIG. 19, a first data can be stored in a first portion of a data array (e.g., an electronic file stored in memory element 194), the first data corresponding to the intensity of the first reflection of the light sources 30A and 30B (i.e., received by camera 20A).

These methods can also include the step 204 of causing the light source to illuminate a second portion of the structural component. In some implementations, the step of causing the light source to illuminate the second portion of the structural component can include moving the structural component from a first position to a second position. As illustrated in FIG. 6, motorized rollers 66A and 66B can be configured to move the structural component 10 from a first position to a second position. Alternatively, the structural component 10 can be moved from a first position to a second position by way of finish (or pinch) rollers 71 as shown in the example of FIG. 17. Light sources 30A and 30B can be activated (or remain activated from step 201) so that a second portion of the structural component 10 is illuminated. The methods can include the step 205 of receiving a second reflection of the light source from the second portion of the structural component. For example, a second reflection of the light sources 30A and 30B can be received by camera 20A. The methods can include the step 206 of storing a second data in a second portion of an array. For example, and as illustrated in FIG. 19, a second data can be stored in a second portion of the data array (e.g., the electronic file stored in a memory element 194), the second data corresponding to the intensity of the second reflection of the light sources 30A and 30B (i.e., received by camera 20A). It is to be appreciated that steps 204 through 206 can be repeated (i.e., causing the light source to illuminate additional portions of the structural component, receiving additional reflections of the light source from the additional portions of the structural component, and storing additional data in additional portions of the array) until the all desired portions of the structural component are imaged.

In some implementations, the methods can include the optional step 207 of processing the data array to remove data that does not correspond to at least one of the group consisting of a lumber piece, a support plate, and an identification device. For example, at the completion of step 206, the data array can represent a complete image of the structural component. As illustrated in FIG. 18, the structural component may include one or more lumber pieces 13, one or more support plates 16, and one or more identification devices 19. Because the data stored in the data array includes not only the representation of the structural component but also background images (for example, the empty space between portions of the structural component and corresponding to the backdrop 79 as shown in FIG. 6), it may be desired to remove the background portions so that the only data stored in the data array corresponds to the structural component itself.

The methods of the present invention can include the step 208 of comparing the data array to at least one reference array. For example, the data array (which can be stored in memory 194 of FIG. 19) can be compared to a reference array (which can be stored in memory 195 of FIG. 19). The reference array may be a computer aided design (CAD) file, an image file, or other type of file that corresponds to a reference design of the structural component to be inspected or validated. More than one reference array can be stored in a memory (e.g., memory 195 of FIG. 19), each reference array corresponding to a different reference structural component design. In some implementations, the step of comparing the data array to the at least one reference array can include: selecting one of the at least one reference array; searching the first array to determine the presence and relative location of at least one of a lumber piece and a support plate; searching the selected one of the at least one reference array to determine the presence and relative location of at least one of a lumber piece and a support plate; and determining if the one or more lumber piece and support plate of the first array have a presence and relative location corresponding to the one or more lumber piece and support plate of the selected one of the at least one reference array.

In some implementations, the step of selecting one of the at least one reference array can include (i) receiving an input from a human interface device and (ii) selecting the at least one reference array corresponding to the input from the human interface device. For example, a human interface device such as a mouse, keyboard, keypad, button, switch, or touch screen can be used by a machine operator to identify the reference structural component design to which the structural component under test is to be compared.

In alternative implementations, the step of selecting one of the at least one reference array can include (i) detecting the presence of an identification device such as a bar code, a label, printed text, a machine readable pattern, or the like, and (ii) selecting a reference array corresponding to the identification device. For example, and as illustrated in FIG. 18, the structural component 10 can include an identification device 19. The identification device may be affixed via an adhesive means (such as glue, tape, a staple, or a nail) to a portion of the structural component (for example, a lumber piece 13). Alternatively, the identification device may include ink or dye which is impregnated in a portion of the structural component. The identification device can have a bar code, a label, printed text, a machine readable pattern, or the like, which identifies a specific reference structural component design or which identifies a serial number of the specific structural component being imaged. After an identification device has been detected, one of at least one reference array can be selected, the reference array corresponding to the identification device. For example, and as illustrated in FIG. 19, multiple reference arrays may be stored in memory element 195. Processor 197 and software 198 can be configured to, with reference to the data array stored in memory element 194, detect an identification device and select the appropriate reference array stored in memory element 195.

In other alternative implementations, the step of selecting a reference array can include (i) determining the presence of a uniform structure such as a support plate or a portion or facsimile thereof, the uniform structure including an identification means such as a bar code, a label, printed text, a machine readable pattern, or the like, and (ii) selecting the at least one reference array corresponding to the identification means. A bar code, a label, printed text, machine readable pattern, or the like, can be affixed to, impregnated on, or formed in, a uniform structure such as a support plate or a portion or facsimile thereof. In one example, the support plate may have printed text or patterns which identify the particular structural component. In another example, the support plate may have one or more holes which form a machine readable pattern.

In other examples, a facsimile of a support plate or a portion thereof may be used. These facsimiles may be in the form of a printed label having openings or patterns thereon (e.g. light/dark contrast) that resemble a support plate, or a portion thereof, together with identification information. The system recognizes the uniformity of the pattern on the facsimile and then searches for the identification information. After a support plate or facsimile has been identified, one of the at least one reference array can be selected corresponding to the identification made.

In some implementations, the step of determining the presence of a support plate can include: first identifying the presence and relative location of at least one potential support plate; then identifying from the at least one potential support plate the presence and relative location of at least one likely support plate; and lastly identifying from the at least one likely support plate the presence and relative location of the support plate. For example, and as illustrated in FIG. 18, the step can include first identifying the presence and relative locations of at least one structure that may be a potential support plate, the structures which may include, among other things, support plates 16, identification device 19, and color defects (not shown) in lumber pieces 13. These structures may then be subject to further analysis (i.e., a detailed analysis of one or more characteristics such as size, shape, color, orientation, etc.) to eliminate potential structures that are not likely to be support plates (i.e., that are likely to be identification devices or color defects in lumber pieces). The likely support plates may then be subject to further analysis (i.e., a detailed analysis to determine if any contain a bar code, a label, printed text, or machine readable patterns). If an identification is found, it may be used to find the appropriate reference for use in a comparing step. For some structural components, only a particular type of support plate is used (e.g., made by a particular manufacturer, or being of a particular size, etc.); thus, if such a support plate is identified, that information can be used to find the appropriate reference for use in the comparison step.

Referring to FIG. 20, the methods can include the step 209 of indicating the results of the comparison of the data array and the at least one reference array. In some implementations, the indicating step can include displaying a representation of the first array and a representation of the reference array on a monitor. For example, an image of the structural component (i.e., the image stored in the first array) and an image of the reference structural component design (i.e., the image stored in the reference array) can be displayed on a monitor. The images may be overlaid on top of each other or may be displayed side by side. In another example, the results of the comparison can be indicated by turning a light on or off, sounding an alarm, and the like. It is to be appreciated, however, that the results may also be indicated by electronically storing the results in memory.

An Exemplary Method of Validating the Construction of a Pre-Engineered Structural Component In some embodiments, methods of validating the construction of a pre-engineered structural component can include: creating at least one computer readable image of the structural component; calibrating the dimensions and orientation of the at least one image with reference to at least one support plate; selecting one of at least one reference image, the reference image corresponding to at least one reference structural component design; comparing the at least one computer readable image with the selected reference image; and indicating a result of the comparison.

Figure 21:
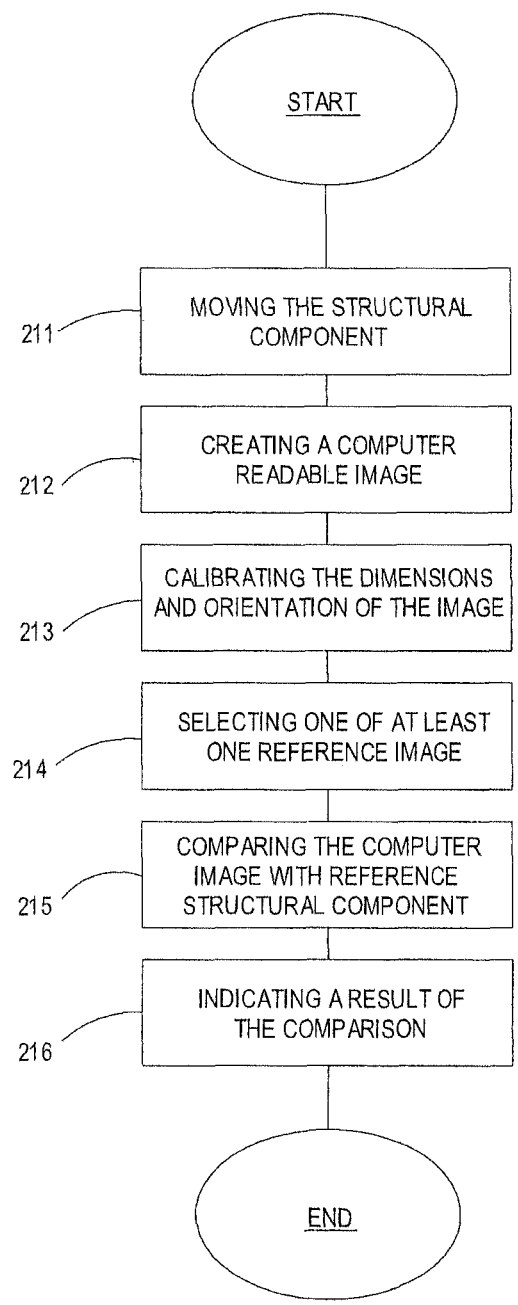
FIG. 21 is a diagram showing another embodiment of a method of validating the construction of a structural component in accordance with the present invention.

In some implementations, the methods can include the step of moving the structural component from a first position to a second position by at least one mechanized roller. Referring now to FIG. 21, the method can include the optional step 211 of moving the structural component. As illustrated in the example of FIG. 12, a structural component 10 may be located on a system including rollers 66A, 66B, 63A and 63B. In one example, one or both of rollers 66A and/or 66B may be operably coupled to motor 69. In another example, a system may include motorized finish (or pinch) rollers 71 (as shown in FIG. 17) which cause the structural component 10 to be moved through the system, between rollers 66A and 66B, and on top of support roller 63.

The methods can also include the step 212 of creating at least one computer readable image of the structural component. In some implementations, the step of creating the at least one computer readable image can include: first detecting a leading edge of the structural component; then beginning reading data from at least one camera; then detecting a trailing edge of the structural component; and finally stopping reading data from the at least one camera. In further implementations, the step of detecting the leading edge can include determining when an output of a first edge sensor changes state. In other implementations, the step of detecting the trailing edge can include determining when an output of a second edge sensor changes state. As illustrated in the examples of FIGS. 7A and 7B, a leading edge of the structural component 10 may be detected by a first edge sensor transmitter/receiver pair 53C & 53D, and a trailing edge of the structural component 10 can be detected by a second edge sensor transmitter/receiver pair 53A & 53B. The first and the second edge sensors (which may be optical sensors) can be configured to change states when the optical path between the transmitter and receiver is broken. A system can be configured to poll the output of the receivers and determine when the optical path is broken (by the structural component 10 being located between the first edge sensor 53C/53D) and established (by the structural component 10 being removed from between the second edge sensor 53A/53B). After the leading edge of the structural component 10 is detected, a system can begin reading data from one or more cameras (i.e., cameras 20A and 20C as illustrated in FIG. 6). After the trailing edge of the structural component is detected, the system can stop reading data from the cameras. It is to be appreciated that in an alternative implementation, a system may not include edge sensors. In such a case, a system can continually read data from the cameras and perform image processing to determine when a structural component is no longer in the camera's view.

In further implementations, the method can include: processing the at least one computer readable image to remove data that does not correspond to at least one of the group consisting of a lumber piece, a support plate, and an identification device; mathematically compressing the at least one computer readable image; and storing the one or more computer readable image in a memory device. It can be appreciated that typical structural components contain a significant amount of space in between structural pieces (i.e., with reference to FIG. 18, there is a large amount of space in between individual lumber pieces 13). Thus, to provide for more efficient processing and storage of the images received by the cameras, it may be desirable to remove data that does not correspond to lumber pieces, support plates, and/or identification devices. As illustrated in the example of FIG. 13, the structural component may be located between light source 30A and a neutral (preferably black) backdrop 79A. A similar backdrop 79B may be provided for light source 30B. By utilizing image processing techniques, the backdrop 79A may be removed from the image of the structural component. Once removed, the resulting image may be mathematically compressed (for example, by a JPEG-variant or similar compression scheme). Finally, the compressed image may be stored in a memory device for subsequent processing.

Figure 14:
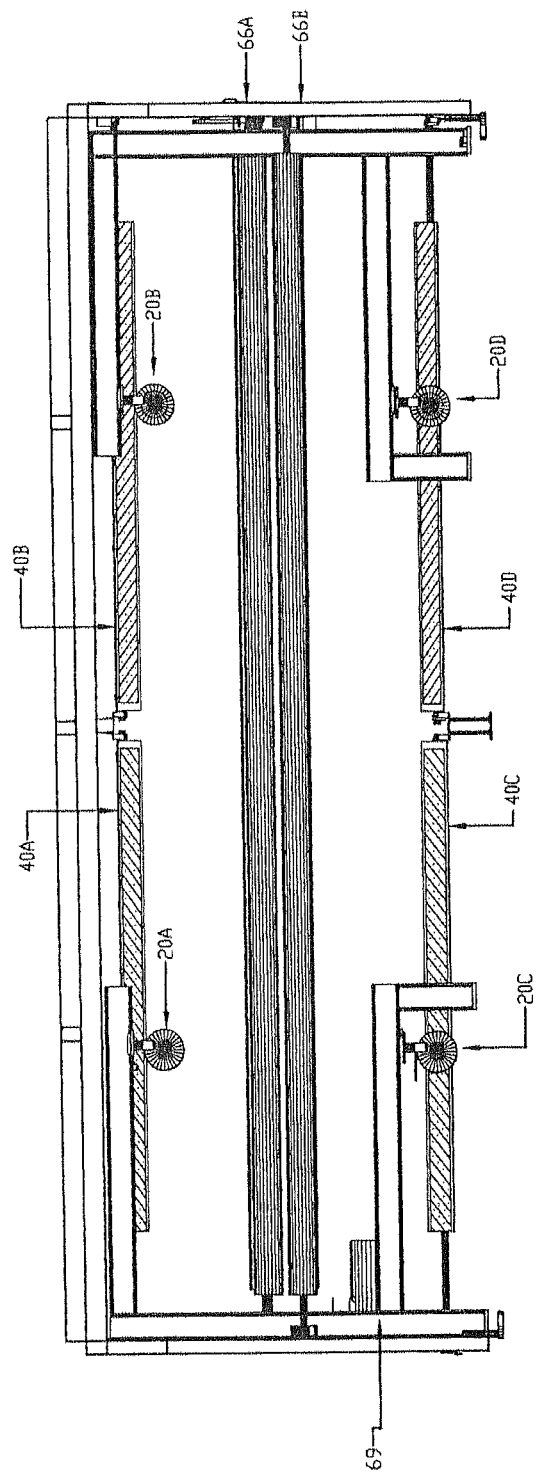
FIG. 14 is a front end elevational view of another embodiment of an apparatus in accordance with the present invention.

In some implementations, the methods can include creating at least two computer readable images of the structural component. For example, and as illustrated in the embodiment of FIG. 13, a first computer readable image may be created which corresponds to the top side of the structural component (as received by camera 20B) and a second computer readable image may be created which corresponds to the bottom side of the structural component (as received by camera 20D). In other examples, and as illustrated in FIG. 14, a system may be configured to include two or more cameras 20A and 20B configured to image the top side of the structural component and two or more cameras 20C and 20D configured to image the bottom side of the structural component. In such a case, four computer readable images of the structural component can be created.

In further implementations, the methods can include the step of correlating the at least two computer readable images which can include: locating a first feature in a first of the at least two computer readable images; locating a second feature in a second of the at least two computer readable images, wherein the second feature corresponds to the first feature; and using a normalized cross correlation algorithm to correlate the first computer readable image and the second computer readable image about the first and the second features, respectively. For example, and as illustrated in the embodiment of FIG. 15, a first camera 20A may be configured to image the top side of structural component 10 from a location from the far left (as shown) to just right of the midpoint, and a second camera 20B may be configured to image the top side of the structural component 10 from a location from just left of the midpoint to the far right (as shown). A first feature (e.g., a lumber piece, support plate, or identification device) may be located in an image created by the first camera 20A. A second feature, which corresponds to the first feature, may be located in an image created by the second camera 20B. It is to be appreciated that the location of the first feature of the first image and the second feature of the second image will normally be located at a position where the view of the two cameras overlap (e.g., near a midpoint). A normalized cross correlation algorithm can be used to correlate the first and the second images with reference to the selected features. It is also to be appreciated that multiple images (i.e., more than two per side) may be correlated in the same way, where multiple cameras are provided. It is also to be appreciated, with reference to the exemplary embodiment of FIG. 15, that the step of correlating the images is not limited to images corresponding to the same side of the truss (i.e., correlating the image from camera 20A and 20B). For example, the image from camera 20A may be correlated with the image from camera 20C. In another example, the images from each camera 20A, 20B, 20C, and 20D can be correlated.

The methods can also include the step 213 of calibrating the dimensions and orientation of the at least one image with reference to at least one support plate. As illustrated in the example of FIG. 16, a camera 20A may be placed a distance away from the portion of the structural component 10 to be imaged. Although the general position of the camera is known, the precise position may not be. Furthermore, the angle at which camera 20A is directed may not be known. These imprecisions may affect the reliability of the inspection and validation process. Gang nail plates generally consist of a piece of metal having numerous perforations cut therein. The relative location and sizes of the perforation can be made, and generally are made, with very tight tolerances. As such, they provide a reliable basis for calibrating the dimensions an orientation of the images received from the cameras. Furthermore, such support plates have consistent power cepstrum profiles. The power cepstrum is an algorithm which can be used to precisely identify an image. For example, the power cepstrum of a support plate having unique spectral characteristics (e.g., known light and dark patterns) is unique and can be consistently repeated with low deviation. Accordingly, in some implementations, the step of calibrating the dimensions and the orientation of the at least one computer readable image can include: selecting a portion of at least one support plate candidate; computing the power cepstrum of the selected portion of the at least one support plate candidate; identifying from the power cepstrum the at least one support plate; and adjusting the dimensions and the orientation of the at least one computer readable image corresponding to stored dimensions of the at least one support plate. For example, an image processing algorithm can identify and select a portion of the image corresponding to a probable support plate (or a portion of a support plate). The algorithm can compute the power cepstrum of the selected portion and determine therefrom if the probable support plate is likely to be a support plate. If it is, the dimensions and orientation of the image may be adjusted to correspond to the known dimensions of the support plate identified. It is to be appreciated that algorithms other than computing the power cepstrum may alternatively be used. For example, if the known sizes of perforations in a gang nail (support plate) are $\frac{1}{16}" \times \frac{1}{16}"$ and the perforations in the image are 2 pixels×2 pixels, the image can be calibrated (adjusted) so that each pixel corresponds to $\frac{1}{32}" \times \frac{1}{32}"$. It can be appreciated that, to some degree, the images received from the cameras are non-linear because the distance between the camera and the structural component at a direct (i.e. perpendicular) angle of intersection with the reflective device is different than the distance between the camera and the structural component at a non-direct (i.e., non-perpendicular) angle of intersection. In these situations, it may be desirable to calibrate the dimensions of the image across the entire viewing area of the camera.

The methods can also include the step 214 of selecting one of at least one reference image, the at least one reference image corresponding to at least one reference structural component design. In some implementations, the step of selecting one of the at least one reference image can include (i) receiving an input from a human interface device and (ii) selecting the one of the at least one reference image corresponding to the input. For example, a system can include a human interface device such as a keyboard, a keypad, a mouse, or a touch screen. An operator can indicate which reference structural component (and thus which reference image) is to be used.

Alternatively, the reference image can be selected corresponding to an identification device. In some implementations, the step of selecting one of the at least one reference image can include (i) determining the presence of an identification device including at least one of a bar code, a label, printed text, a machine readable pattern or the like, and (ii) selecting the one of the at least one reference image corresponding to the identification device. In further implementations, the step of determining the presence of the identification device can include searching for a known identification device pattern. For example, an identification device can include a machine readable pattern or bar code. An algorithm can be used to detect the pattern or bar code and identify a corresponding reference image. In an alternative implementation, the step of determining the presence of the identification device can include: selecting a portion of at least one identification device candidate; computing the power cepstrum of the selected portion of the at least one identification device candidate; and identifying from the power cepstrum the identification device. As above, the power cepstrum is an algorithm which can be used to identify, with great precision, patterns in a portion of an image (although other algorithms may alternatively be used). As such, the power cepstrum can be computed on an area in the image which has been determined to possibly be an identification device. The result can be compared to known power cepstrums of different identification devices, and if there is a match, the identification device can be selected.

Alternatively, the reference image can be selected corresponding to a support plate. In some implementations, the step of selecting one of the at least one reference image can include (i) determining the presence of a support plate including at least one of a bar code, a label, printed text, a machine readable pattern or the like, and (ii) selecting the one of the at least one reference image corresponding to the identification device. In further implementations, the step of determining the presence of the support plate comprises: selecting a portion of at least one support plate candidate; computing the power cepstrum of the selected portion of the at least one support plate candidate; and identifying from the power cepstrum the support plate. For example, different structural components may be formed from unique support plates (i.e., for any given structural component, unique support plates can be used). An image processing algorithm can identify and select a portion of the image corresponding to a probable support plate (or a portion of a support plate). The algorithm can then compute the power cepstrum of the selected portion and determine therefrom if the probable support plate is likely to be a support plate. If the support plate candidate has a power cepstrum which corresponds to a known power cepstrum of a support plate, the reference image can be chosen accordingly. This method of selecting reference images is available where it is known that the structural component is manufactured using unique or particular nail plates. If the unique or particular nail plate used for the subject structural component is identified from known nail plate candidates, a reference image for that structural component can be readily identified.

The methods can also include the step 215 of comparing the at least one computer readable image with the selected one of the at least one reference structural component design. For example, the step can include a first sub-step wherein a point to point pattern match is performed to align the position of one or more support plates contained in the computer readable image to corresponding support plates contained in the reference image. The point to point pattern match ensures that the system is tolerant of missing and/or misaligned support plates. The step can also include a second sub-step wherein one or more dimensions of the structural component (as reflected in the computer readable image) are compared to corresponding dimensions in the reference structural component design (as reflected in the reference image). This sub-step may be performed to determine whether the features of the structural component are within tolerances of the design specification and also to identify any discrepancies therein.

For example, and as illustrated in FIG. 18, one dimension may include the length from the apex of the structural component 10 to the location of the first support plate 16 on the left side. Another dimension may include the distance between the two innermost support plates 16 on the lower lumber piece 13. Another dimension may include the top angle formed by the two innermost lumber pieces 13. These and/or other (or all) specific dimensions to be compared may be selected for quality assurance purposes.

The methods can also include the step 216 of indicating a result of the comparison to assist a user or computerized process in deciding whether or not the structural component has been fabricated correctly and whether it is in a condition for use. The report may be in any suitable form such as an audible or visible signal, a display to a terminal or other peripheral device, a printout or other hard copy, or any combination of these. The report may provide any level of detail of the results of the analysis, including reporting both good and bad conditions noted with respect to the structural component. The user or computerized process may then determine whether the structural component is suitable for use, or whether any further action or repair is needed before such use may be made.

An Exemplary Automated System for Taking Images of a Pre-engineered Structural Component In some embodiments, automated systems for taking images of a pre-engineered structural component can include: a lighting enclosure comprising a proximal opening and a distal opening; at least one camera provided near the distal opening; at least one structural component detector; a processor in communication with the at least one structural component detector, and the at least one camera; and a program associated with the processor, wherein the program and the processor are configured to capture and process at least one image received from the at least one camera. In alternative embodiments, the processor may also compress and/or store the received image.

It can be seen from the exemplary embodiments illustrated in of FIGS. 1-11, that the present invention may include upper and lower lighting enclosures, generally 70A and 70B, mounted, respectively, above and below the path of a structural component 10 that has been recently fabricated. Lighting enclosures 70A and 70B may each have a proximal opening between the structural component 10 and one or more light sources contained therein. Lighting enclosures 70A and 70B may also each have a distal opening between the structural component 10 and one or more reflective surfaces (usually mirrors) contained therein. At least one camera 20A and 20C may be provided near the distal openings of lighting enclosures 70A and 70B, respectively. It is to be appreciated that other embodiments of the present invention may provide only an upper 70A or only a lower 70B lighting enclosure (and related lighting source(s), reflective surface(s) and camera(s)).

It can also be seen that in these illustrated embodiments, the structural component 10 may be sandwiched between drive rollers 66A and 66B which move the structural component along a path between lighting enclosures 70A and 70B. In some implementations, the system can include a support unit with at least one motorized roller for advancing the structural component in a direction. Preferably, lower drive roller 66B imparts movement to the structural component 10, while upper drive roller 66A prevents vibration (damping) of the structural component 10 during movement so that clear images of the structural component 10 may be captured; although upper roller 66A and/or other rollers may also or alternatively be used to impart motion. In another example, neither lower drive roller 66B nor upper drive roller 66A impart movement to the structural component 10. The system can be configured to include a finish (or pinch) rollers 71 which forces the structural component through drive rollers 66A and 66B, both drive rollers 66A and 66B being configured to prevent vibration of the structural component 10. Additionally, one or more support rollers 63 can also be provided to support the structural component 10. In some embodiments, one or more support rollers 63 may provide support for the structural component 10 as it travels between these devices. In many cases, structural component 10 will have just been fabricated by finish (or pinch) rollers 71 and travels directly from the finish rollers to the inspection area (containing the cameras and lighting enclosures, etc.).

Details of an embodiment of an upper lighting enclosure 70A are shown in FIG. 11. Upper lighting enclosure 70A can include an elongated front wall 76 and an elongated back wall 77. In one example, if the widest anticipated structural component 10 is approximately 12 feet across, the housings and rollers may be 14 feet 8 inches in length in order to allow the structural component to be out of alignment by several inches. It is to be appreciated that other smaller or larger dimensions may also be used. An elongated partial top wall 75 may also be provided, leaving an elongated opening 78 along the top of upper lighting enclosure 70A. The sides of upper lighting enclosure 70A may be open which provides easy access to the interior; however, they may be closed in alternative embodiments in order to minimize the entry of debris or unwanted foreign matter. In some implementations, the lighting enclosure can be configured to block most ambient light and/or configured to add light suitable for reception by the at least one camera.

As illustrated in the exemplary embodiment of FIG. 6, inside upper lighting enclosure 70A, one or more light sources 30A and 30B may be provided to illuminate the structural component 10 passing below the upper lighting enclosure 70A. In further implementations, the lighting enclosure can include a reflective surface such as a mirror. One or more preferably elongated reflective surfaces 40A are provided along the top of back wall 77 on the inside. Reflective surface 40A may be fixed or adjustable and may be angled such that it reflects an image of the structural component through opening 78 where it can be observed by camera 20A. Reflective surface 40A may be provided on back wall 77, integrated with its own angled support wall 74, or with top wall 75, or provided separately. An elongated flap 15 may also be provided adjacent to back wall 77, which may be hingedly attached and which may cover lower lighting enclosure 70B when dual housings are used. In other implementations, the interior of the light enclosure can be uniformly painted with a color suitable for quick mathematical compression of the at least one image. For example, the interior of the light enclosure may be painted black. It can be appreciated that although the above description is made with reference to upper lighting enclosure 70A, lower housing enclosure 70B (if provided) may have similar features.

In some implementations, the systems can include at least one position sensor. Referring to the illustrated embodiment of FIGS. 7A and 7B, a position sensor 56 may be provided to detect the position of the structural component 10 as it passes through the invention. Position sensor 56 coordinates the timing and speed of travel of the structural component through rollers 66A and 66B with the image captured by the camera 20A. For example, position sensor 56 may be an optical rotary encoder. It can be appreciated that the position sensor can be provided in any of a number of ways, including without limitation, as a separate device 56, as shown, or as part of a subassembly of either roller 66A, 66B or 67, or part of a subassembly of motor 69, or in any other suitable manner. For example, the position sensor can be included in the finish (or pinch) rollers 71 which fabricate the structural component 10.

The systems may also include structural component sensors 53A/53B and/or 53C/53D. One or more structural component sensors 53A-53D can be provided adjacent to one or both of lighting enclosure 70A and 70B to detect the entrance and/or the exit of the structural component 10 from the invention. Pairs of transmitters 53A and 53B and associated receivers 53C and 53D, respectively, may be provided to detect the presence of a structural component 10. Any appropriate type and number of structural component sensors may be used including, without limitation, optical, sound, photo, magnetic, etc. sensors, so that detection occurs before and after the structural component 10 reaches and exits lighting enclosure 70A or 70B. For example, sensor pair 53C and 53D can be configured to detect a leading edge of the structural component 10, and sensor pair 53A and 53B can be configured to detect a trailing edge of the structural component. Once a structural component 10 is detected, light sources 30A and 30B and camera(s) 20A may be activated so as to capture images of the structural component 10 as it is being moved through the system. In some embodiments, the structural component sensors are photo sensors and are used to start and stop the motorized rollers.

Figure 1:
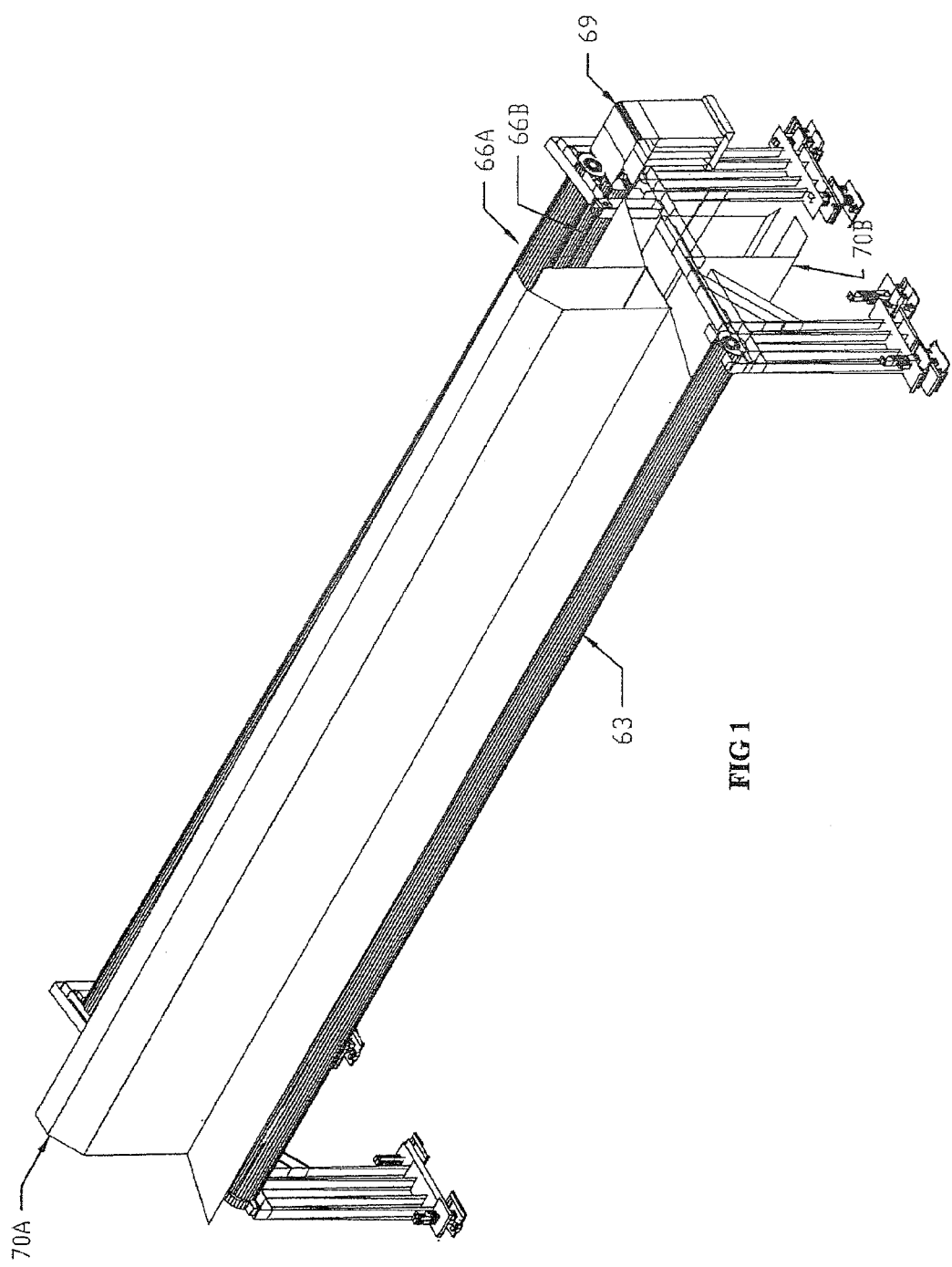
FIG. 1 is a left side rear perspective view of an embodiment of an apparatus in accordance with the present invention.
Figure 2:
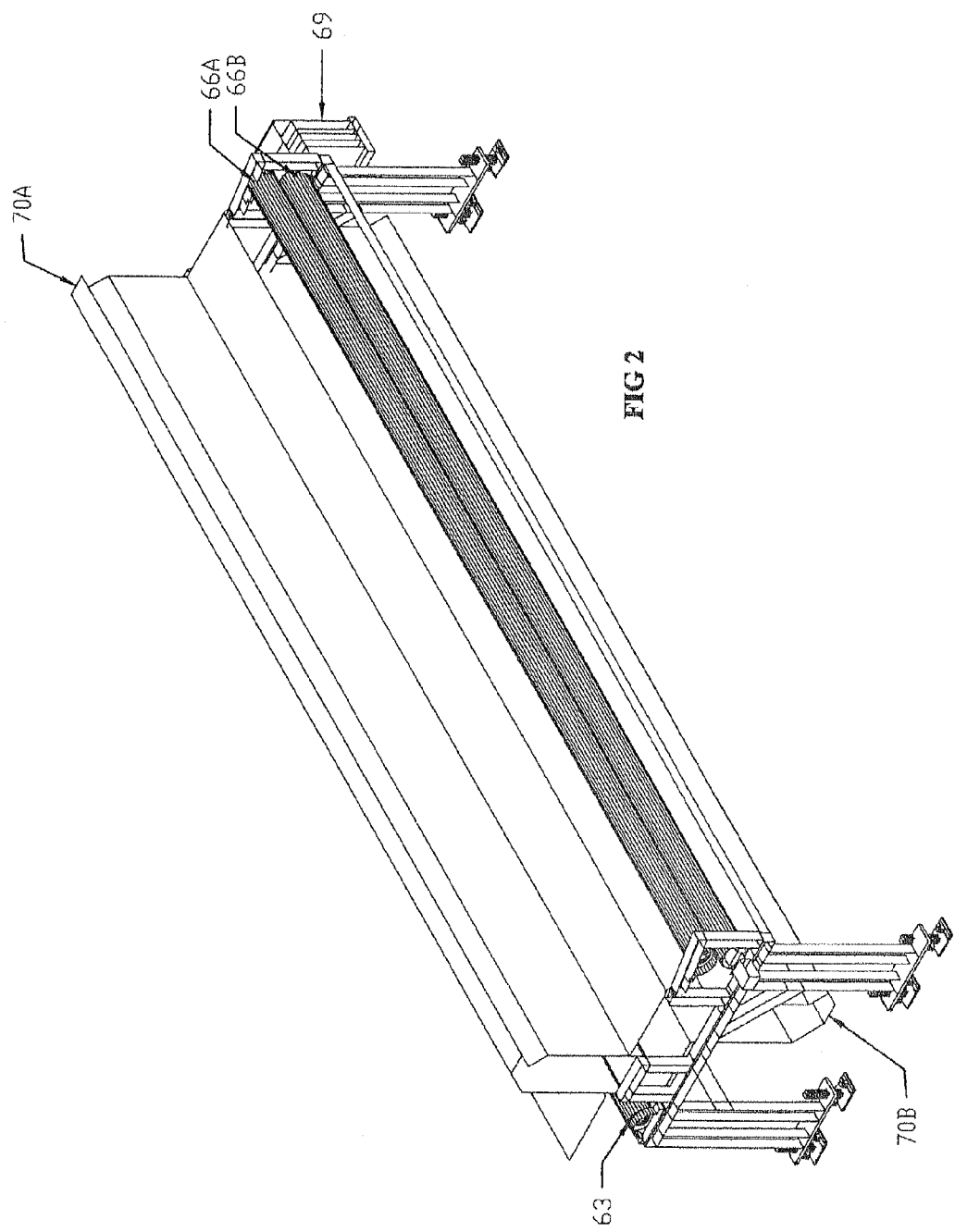
FIG. 2 is a left side front perspective view of the embodiment of FIG. 1.
Figure 3:
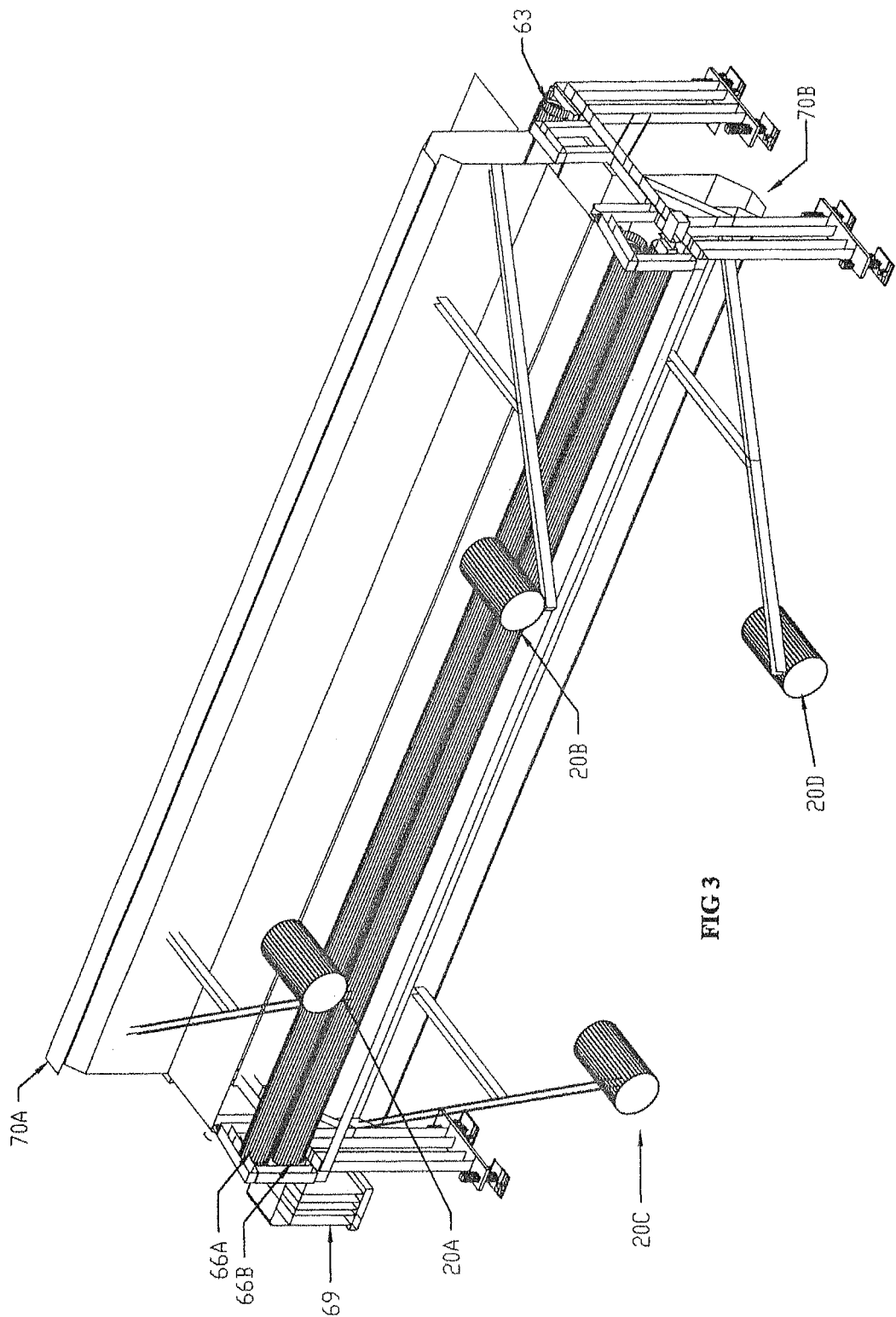
FIG. 3 is a right side front perspective view of another embodiment of an apparatus in accordance with the present invention.
Figure 4:
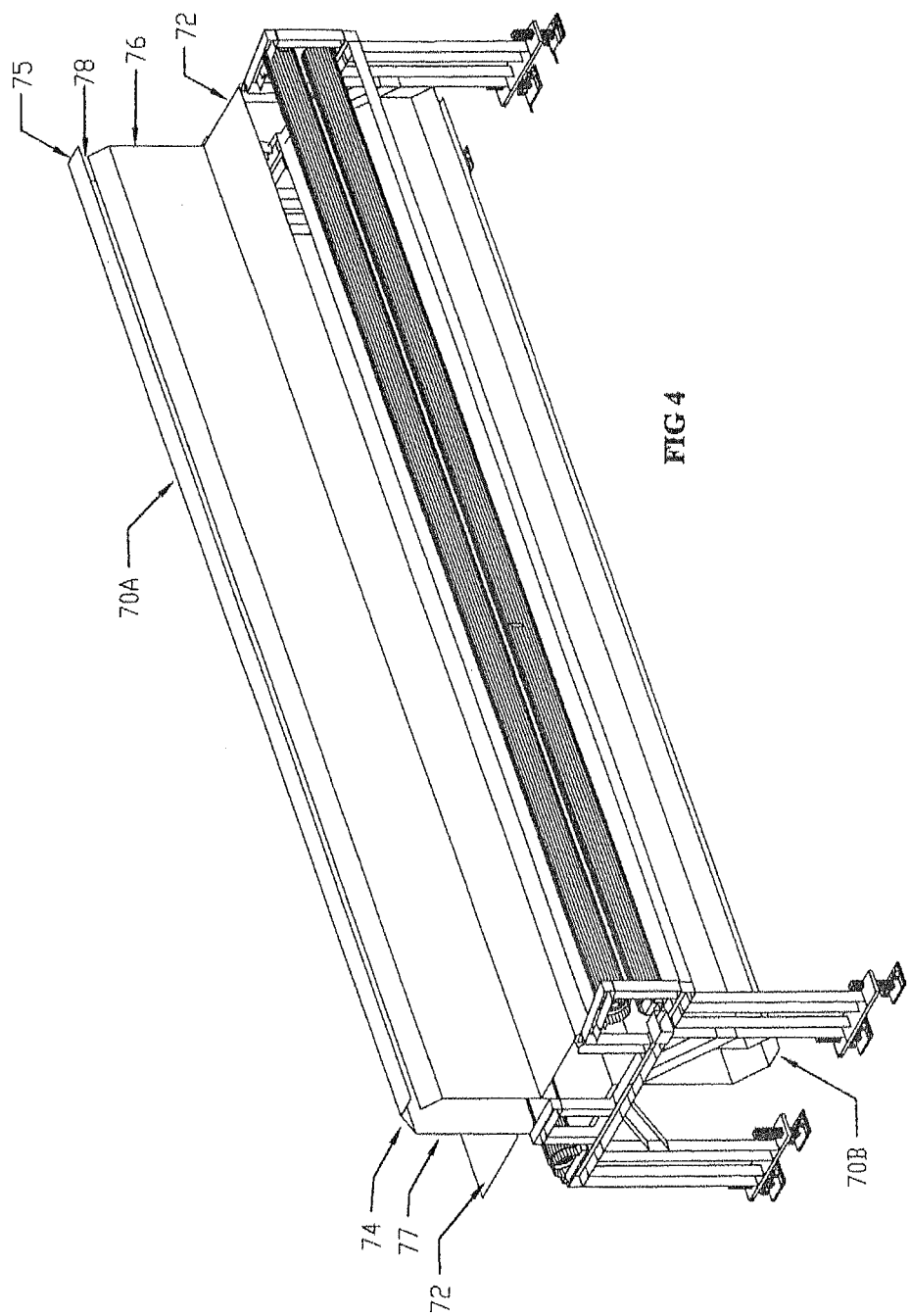
FIG. 4 is a left side front perspective view of the embodiment of FIG. 3.

Referring to FIGS. 3 and 6, one or more supports may be provided to hold one or more cameras 20A and 20B. The supports may be of any appropriate length and may be attached at any appropriate location in order to place the cameras such that they can view the reflection of the structural component 10 through opening 78. As shown, the supports can be attached to the front walls 76 of lighting enclosure 70A, but they may be attached to the legs supporting the rollers, or elsewhere, or they may be attached to structures that are independent of lighting enclosure 70A.

Referring to the exemplary embodiment shown in FIG. 6, it is seen that an image of the upper surface of the structural component 10 can be reflected up along line 85A to reflective surface (mirror) 40A and then along line 83A to camera 20A. Similarly, an image of the lower surface of the structural component 10 can be reflected down along line 85C, reflected off reflective surface 40B, and then along line 83C to camera 20C. Light source 30A and 30B inside lighting enclosure 70A can illuminate a portion of the structural component 10 so that a good image is reflected to camera 20A. The angles of reflective surfaces 40A and 40B should be adjusted to reflect the structural component image to the appropriate camera. In some embodiments, this angle will be about 45 degrees, such as when cameras 20A and 20C are located in a horizontal plane that is substantially the same as that of the structural component 10. However, cameras 20A and 20C may be placed at other angles relative to lighting enclosures 70A and 70B and structural component 10 such that the angles of reflective surfaces 40A and 40B may be significantly different from each other, and may be significantly different from 45 degrees (e.g. from about 30 to about 60 degrees).

In another exemplary embodiment, the light sources 30A and 30B are provided using LEDs in the red spectrum of light, with camera 20A being appropriately selected to receive such light, although any suitable combination of colored light and corresponding light-sensitive camera 20A may be used. Lighting enclosure 70A may be configured to block most of the ambient light which is replaced by the (colored) light provided from light sources 30A and 30B. The use of colored light is designed to swamp any remaining ambient light, and provide a better image to be captured by the camera 20A for later processing. The light is preferably focused along a narrow strip on the structural component 10 under lighting enclosure 70A. It can be appreciated that the foregoing discussion may apply equally to the corresponding elements of the lower lighting enclosure 70B and camera 20C.

Figure 8:
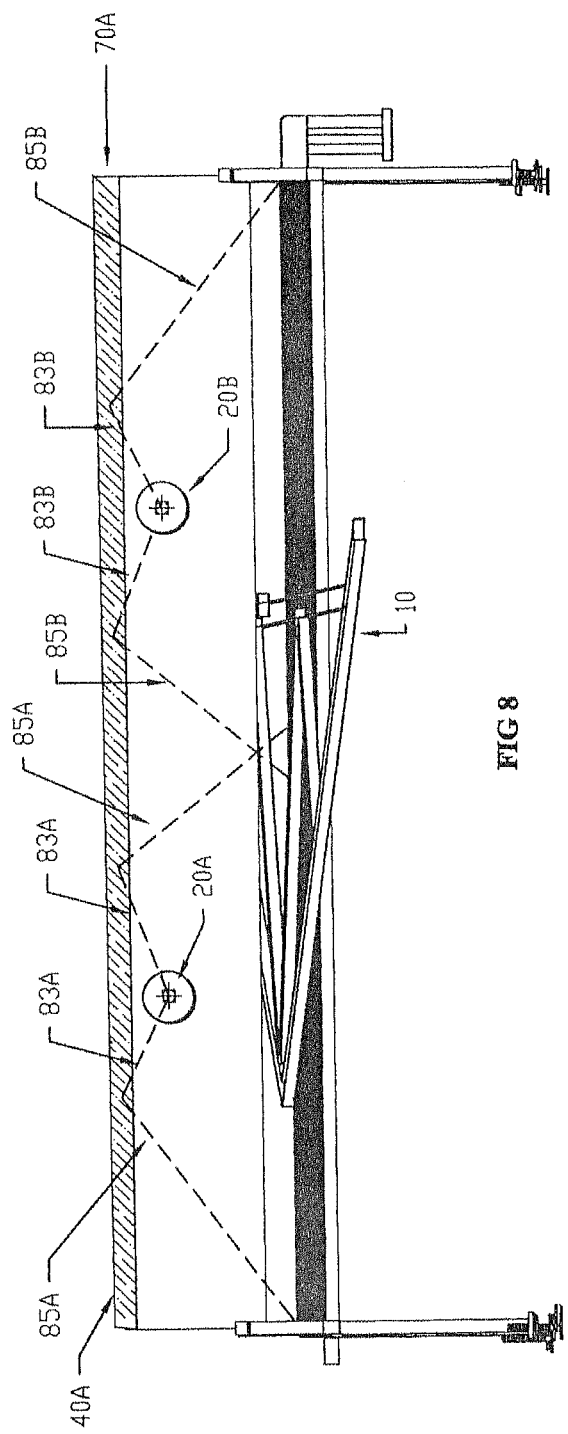
FIG. 8 is a front end elevational view of an embodiment of an apparatus in accordance with the present invention.

One exemplary embodiment of the invention using two cameras 20A and 20B and an upper lighting enclosure 70A is illustrated in FIGS. 8 and 9. It can be seen that in this illustrated embodiment, cameras 20A and 20B are located a sufficient distance away from reflective surface 40A so that, together, they are capable of receiving the entire image of the structural component 10 below that is reflected from the reflective surface 40A. It is to be noted (with reference to FIG. 6) that the viewing angle of cameras 20A and 20B includes not only the horizontal span along lines 83A and 83B, respectively, but also the continued vertical span along lines 85A and 85B, respectively (i.e., the complete distance from the cameras to the structural component by way of the reflective surface). There may be a slight overlap in the images received by cameras 20A and 20B so that no imagery of the structural component 10 is lost. As described previously, a correlation is performed at this overlap area to align the images received from cameras 20A and 20B.

In some implementations, the distance between the reflective surface and the structural component can be less than a distance between the reflective surface and the at least one camera. It is to be appreciated that as shown in FIG. 6, the taller the lighting enclosure 70A the longer the distance 85A, and the shorter the distance 83A allowing camera 20A to be closer to lighting enclosure 70A. Similarly, the shorter the lighting enclosure 70A, the shorter the distance 85A and the longer the distance 83A. The distance along line 85A from structural component 10 to reflective surface 40A may be, for example, 5 feet and the distance along line 83A from reflective surface 40A to camera 20A may be, for example, approximately 10 feet for a total of 15 feet. However, if space constraints at a particular location do not allow for this distance, one or more additional cameras may be employed (as shown in FIG. 5), bringing all cameras closer to lighting enclosure 70A, each camera receiving an image from a portion of reflective surface 40A, with a slight overlap so that no imagery is lost. For example, with reference to the embodiments of FIGS. 8 and 9, if three cameras were employed instead of two, the 15-foot total distance would be reduced by approximately one third, such that the new distance between the cameras and the reflective surface 40A may be reduced to approximately 5 feet, with each camera picking up approximately one third of the image from the reflective surface 40A. Additional cameras may also be employed to further reduce the space required. In other examples, additional reflective surfaces may also be employed thereby reflecting the image of the structural component many times instead of once. The height of lighting enclosure 70A may also be varied according to space needs. It is to be appreciated that similar configurations of cameras, supports, and reflective surfaces may be utilized on a lower lighting enclosure 70B. It is also to be appreciated that the configurations of the lower lighting enclosure 70B (and associated cameras, etc.) may be different than the configurations of the upper lighting enclosure 70A (e.g., upper structure with one camera, lower structure with two; upper structure with two cameras, lower structure with one; upper structure with four cameras, lower structure with two, or other combinations).

In some implementations, the at least one camera can be configured with a resolution sufficient to measure all critical dimensions of the structural component within tolerances determined by the design specification of the structural component. It is also to be appreciated that depending on the precision desired, more than one camera may be employed. For example, and without limitation, a first camera may have a resolution of 2,048 pixels and a reflected field of view of 14 feet. A system configured as such may have a projected image resolution of approximately 1/16 inch per pixel. However, when two such cameras are used, or if a single camera capable of providing 4,096 pixels is used, a higher resolution of 1/32 inch per pixel can be achieved. Thus, the number of cameras used may vary according to the space and/or the precision requirements of the user.

It is to be appreciated that different colors may be used for the light sources 30A and 30B, and/or different filters may be utilized on the camera for optimum optical image capture. The selection of light colors and filters may depend upon, among other things, the type of cameras used (such as infrared, ultraviolet, or other spectrum-specific cameras); the type of wood and metal used in the structural component (from Douglas fir to yellow pine; from aluminum to iron); and the amount of processing to be performed on the captured images In a preferred embodiment, red light and/or filters may be employed in conjunction with a camera having 4,096 pixels per line (to provide an image resolution of 1/16 inch).

An exemplary embodiment of a camera 20 is shown in FIGS. 10A and 10B. In some implementations, the system can include an enclosure configured to protect the at least one camera from dust, moisture, and temperature extremes. A camera 20 may include an enclosure 23 with a mount and an arm adjustable locking mount. The camera 20 can include an image sensor 21 and a lens 25. In other implementations, the camera can include an optical filter for increasing the visual contrast between a lumber piece and a support plate of the structural component. Optical filter 26 may be configured to limit the spectrum of light received by image sensor 21 to that which is most advantageous in a given lighting situation. The camera may also be provided with a positioning laser 29 used for camera alignment.

Referring to the exemplary diagrammatic embodiment of FIG. 19, a processor 197 may be provided in communication with the structural component sensor 199, the motorized roller 191, and the camera 193. The processor 197 may also be in communication with the position sensor 196. In some implementations, the processor and the program can be configured to associate an output of the position sensor and the timing of the camera. For example, the processor and program can receive outputs of the structural component sensor 199 and position sensor 196 and determine the location of the structural component 10 and the speed at which it is moving relative to the cameras.

In some embodiments, a program 198 may be associated with processor 197 and may be configured to capture and process at least one image received from camera 193. In these embodiments, the processor 197 and/or program 198 may also compress and/or store the at least one image. In some implementations, the processor and the program can be configured to (i) identify at least one lumber piece and at least one support plate of the structural component and (ii) measure at least one critical dimension of the structural component. For example, the processor 197 can be configured to perform image processing on the image received from the camera 193. An algorithm can be used to identify one or more lumber pieces and one or more support plates. Once the components are identified, an algorithm can be used to measure critical dimensions (such as length, width, orientation, absolute and relative positions, etc.). For example, as shown in the exemplary embodiment of FIG. 18, an algorithm can measure the distances between support plates 16, the angles between lumber pieces 13, and the length of the lumber pieces 13.

In further implementations, the processor and the program can be configured to compare the at least one critical dimension with a reference structural component design. For example, after the processor and program have measured a critical dimension of the structural component (e.g., a distance between the apex of the structural component 10 and a first support plate 16, as shown in FIG. 18), the dimension can be compared to a reference structural component design (i.e., the expected distance between the apex and a first support plate, as pre-determined by the engineering design of the specific structural component under test). It can be appreciated that one or more structural component design files (e.g., CAD files, vector data files, etc.) may be available to the processor and program for comparison. For instance, a system in accordance with the present invention can be configured to validate the construction of any number of distinct structural components (i.e., each structural component differing in design dimensions) by making available to the processor and program a distinct reference structural component design file corresponding to each distinct structural component (i.e., each distinct structural component has at least one CAD file associated with it).

In some implementations, the processor and the program can be configured to identify the reference structural component design by receiving a manually provided identifier. For example, the system may include a mouse, keyboard, keypad, touch screen, or similar devices whereby a machine operator can identify which of the multiple structural component design files should be used as a comparison to the specific structural component under test. In an alternative implementation, the processor and the program can be configured to identify the reference structural component design by automatically detecting a label on the structural component having at least one of a barcode, text or other identifier. For example, the structural component under test 10 may include a label 19, the label 19 of which may include a barcode. An algorithm can be implemented to detect the label 19 and identify from the barcode which reference structural component design file should be used as a comparison.

In some implementations, the system can include a means for graphically displaying a result of the processing overlaid on the at least one image of the structural component. For example, the processor can be coupled to a display device such as a monitor. The monitor may display an image of the structural component having a result of the processing overlaid thereon. However, it can be appreciated that in other embodiments, the system can include a network attached device, a light, a buzzer or alarm, or any similar device for indicating a result of the processing.

In some embodiments, the image received from the camera(s) is compressed so that it may be more easily manipulated, processed and stored. This compression is achieved by identifying the parts of the structural component (such as lumber and support plates), and eliminating from the image file the spaces between these parts. As illustrated in the example of FIG. 18, a typical structural component 10 can include a large amount of space in between lumber pieces 13. In some embodiments, the structural component is made of lighter substances (lumber) and the background against which the structural component is viewed is uniform and typically darker (e.g., the black interior of housing 70 or backdrop 79), providing a contrast that can be used by the compression program to identify and delete the unneeded background space. As described above, different lighting colors and/or filters may be used to achieve the necessary contrast in the images produced to allow the identification and deletion of unneeded background space from the image file. Applying these techniques makes the image files produced by the invention smaller and easier to store, process and manipulate. The files may be stored on an appropriate medium, and may be accessed later if any questions arise regarding the testing performed on the particular structural component.

An Exemplary Method for Inspecting a Pre-engineered Structural Component

In some embodiments, a method for inspecting a pre-engineered structural component can include: capturing images from both sides of the structural component; identifying the structural component; measuring at least one dimension of the structural component contained in the images; comparing the at least one dimension to a reference structural component design; and reporting a result of the comparison of the at least one dimension. In some implementations, the step of reporting can include graphically displaying a result of the comparison superimposed over the images.

Figure 22:
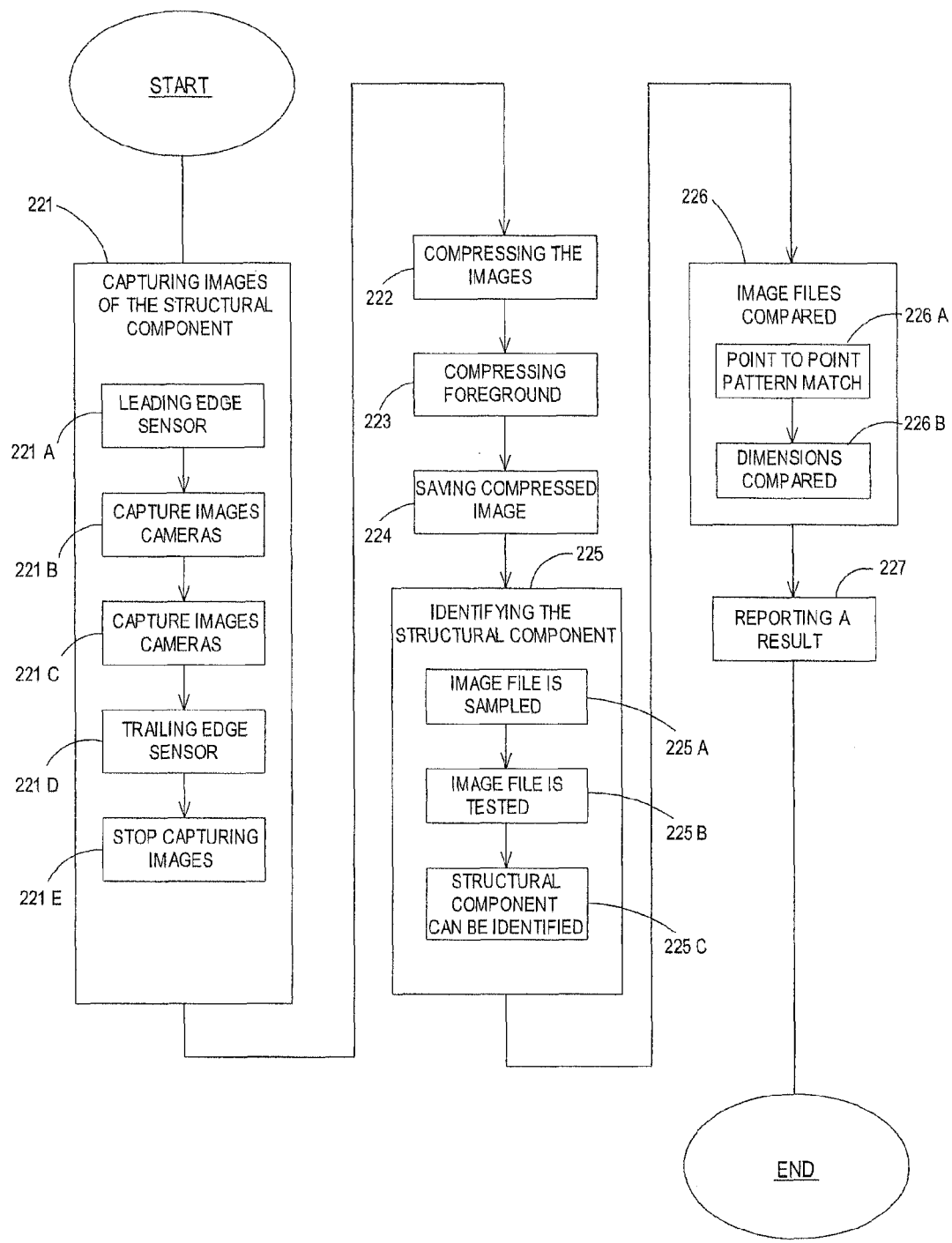
FIG. 22 is a diagram showing an embodiment of a method for inspecting a structural component in accordance with the present invention.

Referring to the exemplary diagrammatical embodiment of FIG. 22, and without limiting the scope of the claims herein, the methods of the invention can include the step 221 of capturing images from one or both sides of the structural component. When the system is enabled, it can detect 221A when a structural component passes between a leading edge sensor transmitter/receiver pair (transmitter 53C/receiver 53D as shown in FIGS. 7A and 7B). The system can then begin 221B to capture images of the structural component from the one or more cameras and continues 221C to do so as the structural component passes though the system. The system can detect 221D a trailing edge of the structural component by trailing edge sensor transmitter/receiver pair (transmitter 53A/receiver 53B as shown in FIGS. 7A and 7B). The system can then stop 221E capturing images. In an exemplary use of an embodiment, and with reference to FIGS. 6, 7A, and 7B, a structural component 10 can be rolled over roller 63 and toward rollers 66A and 66B and lighting enclosures 70A and 70B. In one example, when sensor transmitter 53C/receiver 53D pair detects the presence of the structural component 10, rollers 66A and 66B (which in one example are motorized) can be activated, and move the structural component 10 between lighting enclosures 70A and 70B and completely through the field of view of the cameras 20A and 20C. At the same time, light sources 30A and 30B (and the corresponding light sources for lighting enclosure 70B) can also be activated, creating a focused line of light that the structural component 10 passes under/over. The light can be reflected off the structural component 10 and reflective surfaces 40A and 40B to cameras 20A and 20C, respectively. As the structural component 10 passes under/over the lines of light, cameras 20A and 20C collect and capture images of both sides of the structural component 10. A position sensor 56 can be used to match the image capture speed to the speed of the structural component as it passes though the system. It can be appreciated that one or more images may be captured for any given structural component, for example, an image of the top side and an image of the bottom side. It can also be appreciated that one or more images may be created for any given side, for example, and as shown in FIG. 9, when there are more than one camera imaging a single side of the structural component.

It may be desirable to minimize the size of the data file which contains the image received from the cameras. It can be appreciated that for most structural components, there is a considerable amount of empty space between the lumber pieces of the structural component itself. The present invention is capable of recognizing the differences between locations where there is a lumber piece, support plate, or identification device and where there is nothing, and eliminating the empty space from the image file. Thus, the methods can also include the step 222 of compressing the images by removing the background. Because systems may include, among other features, lighting enclosures with a uniform interior color, one or more flaps which block most of the ambient light, light sources (which may include optical filters) which emit a limited spectrum of light, cameras (which may include optical filters) which receive a limited spectrum of light, and/or backdrops, the captured images of the structural component may include the structural component superimposed with sufficient contrast on an almost pure colored background. This background can be effectively removed by making it a uniform color. Thus, the only remaining data contained in the image is that of the structural component itself (i.e., the foreground). After removing the background, the methods can also include the step 223 of compressing the foreground. The foreground to background ratio may be very small after this step such that standard image compression algorithm (for example, a lossless or near lossless JPEG variant algorithm) may quickly create a compressed image of the structural component. Finally, the methods can include the step 224 of saving the compressed (both compressed by removing the background and/or compressed by compressing the foreground) image.

After capturing, compressing, and storing one or more images of the structural component, the methods can include the step 225 of identifying the location of lumber and support plates and identifying the structural component by an identification device. Because the images of the structural component, even with compression as discussed above, may still be large, it may be necessary to adopt a multi-stage approach to quickly find the critical components without having to process the entire image to the same level of detail. As shown in FIG. 22, identifying the location of lumber, support plates, and identification devices can include a multi-staged approach. In the first stage 225A, the image file may be sampled to look for areas that might be lumber, support plates, or identification devices. In some examples, a fast and course detection may be sufficient to identify the location of support plates, lumber, and identification devices. In the second stage 225B, if needed, the support plates and lumber identified in the first stage may be tested to determine if they are very likely to be support plates or lumber pieces. In some examples, this stage may be necessary to confirm the location of support plates and lumber pieces.

The structural component can be identified in step 225C by either reference to an identification device that was located in step 225A, or, by user input. Each compressed image file may be searched for a bar code, label, stamp, mark or other identification of the particular structural component that has been imaged. If an identification device is found, then a corresponding reference structural component design file (containing support plate and lumber position information, placement tolerances and orientation, and other specifications) for the identified structural component can be selected. If no identification device is found, a default reference structural component design file may be used, or the user may be prompted to identify the reference structural component design file. For example, a system user can select the reference structural component design by using a keypad, mouse, touch screen, or other suitable device.

Once the location of one or more lumber pieces and support plates has been determined, the structural component has been identified, and a reference structural component design file has been selected, the image file of the structural component can be compared, as shown in step 226, to the image file of the reference structural component design to determine whether the structural component meets the required tolerances. In the first sub-step 226A, a point to point pattern match can be performed to align the position of one or more support plates contained in the image file of the structural component to corresponding support plates contained in the image file of the selected reference structural component design. This step may be performed so that the system is tolerant of missing and or misaligned plates. In the second sub-step 226B, one or more dimensions of the structural component (as reflected in the image file) are compared to corresponding dimensions in the reference structural component design to determine whether the features of the imaged structural component are within tolerances of the design specification and to identify any discrepancies therein. For example, and as illustrated in FIG. 18, one dimension may include the length from the apex of the structural component 10 to the location of the first support plate 16 on the left side. Another dimension may include the distance between the two innermost support plates 16 on the lower lumber piece 13. Another dimension may include the top angle formed by the two innermost lumber pieces 13. The specific dimensions to be compared may be selected for quality assurance purposes.

Finally, the methods can include the step 227 of reporting a result of the compared dimensions to assist a user in deciding whether or not the structural component is in a condition for use. The report may be in any suitable form such as an audible signal, a display to a terminal or other peripheral device, a printout or other hard copy, or any combination of these. The report may provide any level of detail of the results of the analysis, including reporting both good and bad conditions noted with respect to the structural component. The image files and the report may also be stored for future use or reference. The user may then determine whether the structural component is suitable for use, or whether any further action or repair is needed before such use may be made.

In an exemplary use of embodiments such as those illustrated in FIGS. 1-7, a structural component 10 is rolled over rollers 63 toward rollers 66A and 66B and the adjacent upper 70A and/or lower 70B housings. When sensors 56 detect the presence of the component 10, rollers 66A and 66B are activated, and move the structural component between housings 70A and 70B. At the same time that rollers 66A and 66B are activated, light sources 30A and/or 30B are also activated, creating a focused line of (colored) light that the structural component 10 passes under/over. The light is reflected on surfaces 40 to cameras 20. As structural component 10 passes under/over the lines of light, cameras 20 collect and capture images of both sides of the structural component 10. The captured images are compressed into smaller files using software that eliminates the void spaces between members of the structural component 10. If more than one image is taken of one side of the structural component 10, the images are correlated into a file. This newly created file is then searched for identification of the structural component, or that identification may be provided from operator input. Once the structural component has been identified, a reference (archive) file is found and the newly-created file is compared to the reference file to determine whether the structural component meets the required tolerances. The results of this comparison are reported to the operator for use in deciding whether or not the structural component is in condition for use.

CONCLUSION/SUMMARY

The present invention provides systems, apparatuses, and methods which are capable of capturing, saving, and processing precise images of pre-engineered structural components, including but not limited to building trusses, wall panels, and other fabricated or composite construction parts, whereby the construction thereof may be efficiently and accurately verified.

It is to be understood that variations and/or modifications of the present invention may be made without departing from the scope of thereof. For example, while examples of the embodiments described above involve building trusses, the methods, apparatuses, and systems of the present invention may also be used and adapted for inspecting building frames, wall panels, and the like. Similarly, the present invention may also be used and adapted to confirm proper placement of elements of such components (e.g., proper placement of studs, openings, etc.) It is also to be understood that the present invention is not to be limited by the specific embodiments, descriptions, or illustrations or combinations of either components or steps disclosed herein.

What is claimed is:

1. A method for inspecting a pre-engineered structural component, comprising:
   a) passing said pre-engineered structural component through an inspection apparatus;
   b) capturing at least one image with a camera of said inspection apparatus, said at least one image being from at least one side of said pre-engineered structural component, said pre-engineered structural component comprising two or more pieces of lumber and at least one support plate;
   c) sending said at least one image to a processing unit of said inspection apparatus;
   d) identifying a pre-engineered structural component design of said pre-engineered structural component using a digital image processing algorithm on at least a portion of at least one support plate in said image;
   e) selecting a reference array that corresponds to said identified pre-engineered structural component design from a plurality of reference arrays stored in an internal memory of said inspection apparatus;
   f) said processing unit performing the steps of (1) detecting one or more characteristics of said pre-engineered structural component contained in said at least one image, including at least one of the presence of a piece of lumber, the relative position of a piece of lumber, the presence of said at least one support plate, and relative position of said at least one support plate, and (2) comparing said one or more characteristics of said pre-engineered structural component with corresponding characteristics in said selected reference array;
   g) measuring at least one dimension of said pre-engineered structural component contained in said at least one image;
   h) comparing said at least one dimension to a corresponding dimension in said reference array; and
   i) reporting a result of the comparison.

2. The method of claim 1, wherein said step of reporting comprises graphically displaying a result of said comparison superimposed over said images.

3. The method of claim 1 comprising the further step of compressing said at least one image.

4. The method of claim 3 comprising the further step of storing said compressed image.

5. The method of claim 1, further comprising the step of moving said pre-engineered structural component from a first position to a second position by at least one mechanized roller of said inspection apparatus.

6. The method of claim 1, wherein said step of capturing said at least one image comprises:
   a) first, detecting a leading edge of said pre-engineered structural component;
   b) upon such first detection, beginning capturing said at least one image of said pre-engineered structural component;
   c) then detecting a trailing edge of said pre-engineered structural component; and
   d) upon such second detection, stopping capturing said at least on image.

7. The method of claim 1, further comprising capturing at least two computer readable images of said pre-engineered structural component.

8. The method of claim 7, further comprising the step of said processing unit correlating said at least two computer readable images.

9. The method of claim 8 wherein said correlating step comprises the sub-steps of:
   a) locating a first feature in a first of said at least two computer readable images;
   b) locating a second feature in a second of said at least two computer readable images, wherein said second feature corresponds to said first feature; and
   c) using a normalized cross correlation algorithm to correlate said first computer readable image and said second computer readable image about said first and said second features, respectively.

10. The method of claim 8, wherein the step of correlating said at least two computer readable images produces a composite image of an entire side of said pre-engineered structural component.

11. The method of claim 1 wherein the step of identifying said pre-engineered structural component design comprises determining the presence of an identification device in said at least one image.

12. The method of claim 11, wherein said step of determining the presence of said identification device comprises searching for a known identification device pattern in said at least one camera image.

13. The method of claim 11, wherein said step of identifying a pre-engineered structural component design of said pre-engineered structural component comprises receiving an input from a human interface device.

14. The method of claim 1, wherein the step of identifying said pre-engineered structural component design comprises determining the presence of said at least one support plate in said at least one image.

15. The method of claim 14, wherein the step of identifying said pre-engineered structural component design further comprises:
   a) selecting a portion of at least one support plate;
   b) computing the power cepstrum of said selected portion of said at least one support plate; and
   c) identifying from said power cepstrum said at least one support plate.

16. The method of claim 1, wherein said at least one image of said pre-engineered structural component is a computer readable image.

17. The method of claim 1, wherein the step of identifying said pre-engineered structural component design is based on at least one identifying characteristic of said pre-engineered structural component in said camera image.

18. The method of claim 1, wherein said pre-engineered structural component design is a truss design.

19. A method for inspecting a pre-engineered structural component, comprising:
   a) inserting said pre-engineered structural component into a first end of an inspection apparatus;
   b) capturing at least one computer readable image of said pre-engineered structural component with a camera of said inspection apparatus, wherein said pre-engineered structural component comprises one or more pieces of lumber and at least one support plate;
   c) sending said at least one computer readable image to a processing unit of said inspection apparatus;
   d) said processing unit selecting a reference array from a plurality of reference arrays stored in an internal memory of said inspection apparatus by
      (1) detecting at least one characteristic of said pre-engineered structural component contained in said at least one computer readable image, including at least one of the presence of a piece of lumber, the relative position of a piece of lumber, the presence of a support plate, and the relative position of a support plate, and
      (2) identifying a reference array corresponding to said at least one detected characteristic; and
   e) said processing unit performing the steps of (1) detecting at least one characteristic of said pre-engineered structural component contained in said at least one computer readable image, including at least one of the presence of a piece of lumber, the relative position of a piece of lumber, the presence of a support plate, and the relative position of a support plate, and (2) comparing said at least one characteristic of said pre-engineered structural component with a corresponding characteristic in said selected reference array.

20. The method of claim 19, further comprising reporting a result of the comparison.

21. The method of claim 20, wherein said step of reporting comprises graphically displaying a result of said comparison superimposed over said images.

22. The method of claim 19, comprising the further step of compressing said at least one computer readable image.

23. The method of claim 22, comprising the further step of storing said compressed image in a memory of said processing unit.

24. The method of claim 19, further comprising the step of moving said pre-engineered structural component from a first position to a second position by at least one mechanized roller of said inspection apparatus.

25. The method of claim 19, wherein said step of capturing said at least one computer readable image comprises:
   a) first, detecting a leading edge of said pre-engineered structural component;
   b) upon such first detection, beginning capturing said at least one computer readable image of said pre-engineered structural component;
   c) then detecting a trailing edge of said pre-engineered structural component; and
   d) upon such second detection, stopping capturing said at least one computer readable image.

26. The method of claim 19, further comprising capturing at least two computer readable images of said pre-engineered structural component.

27. The method of claim 26, further comprising the step of said processing unit correlating said at least two computer readable images.

28. The method of claim 27, wherein said correlating step comprises the sub-steps of:

a) locating a first feature in a first of said at least two computer readable images;
b) locating a second feature in a second of said at least two computer readable images, wherein said second feature corresponds to said first feature; and
c) using a normalized cross correlation algorithm to correlate said first computer readable image and said second computer readable image about said first and said second features, respectively.

29. The method of claim 27, wherein the step of correlating said at least two computer readable images produces a composite image of an entire side of said pre-engineered structural component.

30. The method of claim 19, wherein the step of identifying said pre-engineered structural component design comprises determining the presence of an identification device in said at least one image.

31. The method of claim 30, wherein said step of determining the presence of said identification device comprises searching for a known identification device pattern within said at least one image.

32. The method of claim 30, wherein said step of identifying said pre-engineered structural component design comprises receiving an input from a human interface device in communication with said processing unit.

33. The method of claim 19, wherein the step of identifying said pre-engineered structural component design comprises determining the presence of said at least one support plate in said at least one image.

34. The method of claim 33, wherein the step of identifying said pre-engineered structural component design further comprises:
a) selecting a portion of said at least one support plate;
b) computing the power cepstrum of said selected portion of said at least one support plate; and
c) identifying from said power cepstrum said at least one support plate.

35. The method of claim 19, wherein said pre-engineered structural component design is a truss design.

36. A method for inspecting a pre-engineered structural component, comprising:
a) inserting said pre-engineered structural component into a first end of an inspection apparatus;
b) capturing at least one computer readable image of said pre-engineered structural component with a camera of said inspection apparatus, wherein said pre-engineered structural component comprises one or more pieces of lumber and at least one support plate;
c) sending said at least one computer readable image to a processing unit of said inspection apparatus;
d) said processing unit selecting a reference array from a plurality of reference arrays stored in an internal memory of said inspection apparatus corresponding to at least one characteristic of a support plate of said pre-engineered structural component by
(1) determining the presence of said at least one support plate in said at least one computer readable image, and
(2) identifying a reference image corresponding to said pre-engineered structural component based on said at least one characteristic of said at least one support plate;
e) measuring at least one dimension of said pre-engineered structural component contained in said at least one computer readable image; and
f) comparing said at least one dimension to a corresponding dimension in said selected reference image.

37. The method of claim 36, wherein the step of determining the presence of said at least one support plate in said at least one computer readable image comprises:
a) selecting a portion of said at least one support plate;
b) computing the power cepstrum of said selected portion of said at least one support plate; and
c) identifying from said power cepstrum said at least one support plate.

38. The method of claim 37, wherein said at least one characteristic of said at least one support plate includes said power cepstrum said at least one support plate.

39. The method of claim 36, further comprising reporting a result of the comparison.

40. The method of claim 39, wherein said step of reporting comprises graphically displaying a result of said comparison superimposed over said images.

41. The method of claim 36, comprising the further step of compressing said at least one computer readable image.

42. The method of claim 36, comprising the further step of storing said compressed image in a memory of said processing unit.

43. The method of claim 36, further comprising the step of moving said pre-engineered structural component from a first position to a second position by at least one mechanized roller of said inspection apparatus.

44. The method of claim 36, wherein said step of capturing said at least one computer readable image comprises:
a) first, detecting a leading edge of said pre-engineered structural component;
b) upon such first detection, beginning capturing said at least one computer readable image of said pre-engineered structural component;
c) then detecting a trailing edge of said pre-engineered structural component; and
d) upon such second detection, stopping capturing said at least one computer readable image.

45. The method of claim 36, further comprising capturing at least two computer readable images of said pre-engineered structural component.

46. The method of claim 45, further comprising the step of said processing unit correlating said at least two computer readable images.

47. The method of claim 46, wherein said correlating step comprises the sub-steps of:
a) locating a first feature in a first of said at least two computer readable images;
b) locating a second feature in a second of said at least two computer readable images, wherein said second feature corresponds to said first feature; and
c) using a normalized cross correlation algorithm to correlate said first computer readable image and said second computer readable image about said first and said second features, respectively.

48. The method of claim 46, wherein the step of correlating said at least two computer readable images produces a composite image of an entire side of said pre-engineered structural component.

49. The method of claim 36, wherein said at least one characteristic of said at least one support plate includes at least one of a bar code, a label, printed text, and a machine readable pattern on said at least one support plate.

* * * * *